(12) United States Patent
Lee et al.

(10) Patent No.: US 11,366,546 B2
(45) Date of Patent: Jun. 21, 2022

(54) TOUCH DISPLAY APPARATUS

(71) Applicant: LG Display Co., Ltd., Seoul (KR)

(72) Inventors: SeungJae Lee, Paju-si (KR); JinHo Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/115,545

(22) Filed: Dec. 8, 2020

(65) Prior Publication Data

US 2021/0200414 A1    Jul. 1, 2021

(30) Foreign Application Priority Data

Dec. 31, 2019  (KR) .......................... 10-2019-0180173

(51) Int. Cl.
  *G06F 3/041* (2006.01)
  *G09G 3/36* (2006.01)
  *G06F 3/044* (2006.01)

(52) U.S. Cl.
  CPC ........ *G06F 3/04166* (2019.05); *G06F 3/0412* (2013.01); *G06F 3/0418* (2013.01); *G09G 3/3677* (2013.01); *G06F 3/044* (2013.01); *G06F 3/0443* (2019.05); *G09G 2310/0286* (2013.01); *G09G 2310/0289* (2013.01); *G09G 2310/08* (2013.01); *G09G 2354/00* (2013.01)

(58) Field of Classification Search
  None
  See application file for complete search history.

(56) References Cited

U.S. PATENT DOCUMENTS

| 9,024,913 B1 * | 5/2015 | Jung .................... G06F 3/04184 345/174 |
| 2008/0158175 A1 | 7/2008 | Hotelling et al. |

(Continued)

FOREIGN PATENT DOCUMENTS

| DE | 102016125933 A1 | 1/2018 |
| EP | 2672365 A2 | 12/2013 |

(Continued)

*Primary Examiner* — Dorothy Harris
(74) *Attorney, Agent, or Firm* — Seed IP Law Group LLP

(57) ABSTRACT

A touch display apparatus is disclosed, which includes a display panel on which pixels and touch electrodes are disposed, a main power integrated circuit generating a common voltage signal applied to the touch electrodes and at least one gate voltage signal applied to the pixels, a touch power integrated circuit outputting a touch driving signal of a pulse type in accordance with a touch synchronization signal that defines a display driving period and a touch driving period, outputting a load free driving signal of the pulse type by using a gate low voltage signal of the at least one gate voltage signal, and outputting at least one pseudo touch driving signal corresponding to a pulse patterns of the touch driving signal and the load free driving signal and having reverse phase which is inverted, by using at least one gate high voltage signal of the at least one gate voltage signal, and a gate driving circuit supplying a gate pulse based on the at least one gate voltage signal to gate lines connected to the pixels for the display driving period, and supplying the load free driving signal to the gate lines for the touch driving period.

20 Claims, 16 Drawing Sheets

(56) References Cited

U.S. PATENT DOCUMENTS

| | | | |
|---|---|---|---|
| 2012/0218482 A1* | 8/2012 | Hwang | G06F 3/0445 |
| | | | 349/12 |
| 2014/0292711 A1* | 10/2014 | Teranishi | G09G 3/3696 |
| | | | 345/174 |
| 2015/0177881 A1* | 6/2015 | Chen | G06F 3/0445 |
| | | | 345/174 |
| 2017/0108993 A1* | 4/2017 | Lee | G06F 3/04166 |
| 2017/0147121 A1* | 5/2017 | Yang | G06F 3/041661 |
| 2018/0150184 A1 | 5/2018 | Kim et al. | |

FOREIGN PATENT DOCUMENTS

| | | |
|---|---|---|
| EP | 2975498 A1 | 1/2016 |
| EP | 3151093 A1 | 4/2017 |
| EP | 3506065 A1 | 7/2019 |
| KR | 10-2018-0078441 A | 7/2018 |
| KR | 10-2019-0048189 A | 5/2019 |
| WO | 2010/088653 A2 | 8/2010 |

* cited by examiner

TOUCH DISPLAY APPARATUS

CROSS REFERENCE TO RELATED APPLICATION

This application claims priority from Korean Patent Application No. 10-2019-0180173, filed on Dec. 31, 2019, which is hereby incorporated by reference for all purposes as if fully set forth herein.

BACKGROUND

Technical Field

The present disclosure relates to a touch display apparatus.

Description of the Related Art

With the advancement of the information age, the demand for a display apparatus for displaying an image has increased with various forms. Therefore, various types of display apparatuses such as a liquid crystal display (LCD) apparatus, a plasma display panel (PDP), and an organic light emitting display (OLED) apparatus have been recently used.

Among such display apparatuses, touch display apparatuses provide touch-based input systems enabling users to intuitively and conveniently input information or instructions, rather than using conventional data input systems, such as buttons, a keyboard, or a mouse.

To provide such touch-based input systems, touch display apparatuses should be able to sense a touch performed by a user and accurately detect touch coordinates (or a touched point).

In this regard, capacitance-based touch sensing is commonly used to sense a touch and to detect touch coordinates based on a change in capacitance occurring in a plurality of touch electrodes disposed on a touch panel (or a touchscreen panel) as touch sensors or between the touch electrodes and a pointer, such as a finger.

A touch display apparatus based on such capacitance-based touch sensing should sense a plurality of touch electrodes to sense a touch, and to this end, should apply a touch driving signal to the plurality of touch electrodes.

Meanwhile, a touch display apparatus having a touch sensing function should satisfy a condition that an electromagnetic interference (EMI) level should be a certain level or less.

However, in the existing touch display apparatus, EMI level should be increased due to a touch driving signal for touch sensing. Particularly, when a touch driving signal applied to a touch electrode for touch sensing may be more affected by EMI when a high voltage signal (e.g., 7V) is a pulse type signal having a predetermined frequency.

Such EMI may deteriorate system stability of the touch display apparatus, and may affect a sensing voltage obtained during touch sensing to deteriorate touch sensing performance or adversely affect another peripheral electronic device, whereby various problems may be caused.

The disclosure of the above-described background art is owned by the inventor of the present disclosure to devise this specification or is technical information acquired by a process of devising this specification, but cannot be regarded as the known art disclosed to the general public before this specification is disclosed.

BRIEF SUMMARY

The present disclosure has been made in view of the above problems, and it is an object of the present disclosure to provide a touch display apparatus that may effectively improve (or reduce) EMI level by using an inverse phase signal corresponding to a touch driving signal for touch driving.

In addition to the objects of the present disclosure as mentioned above, additional objects and features of the present disclosure will be clearly understood by those skilled in the art from the following description of the present disclosure.

In accordance with various embodiments of the present disclosure, the above and other objects can be accomplished by the provision of a touch display apparatus comprising a display panel on which pixels and touch electrodes are disposed, a main power integrated circuit (main power IC or PMIC) generating a common voltage signal applied to the touch electrodes and at least one gate voltage signal applied to the pixels, a touch power integrated circuit (touch power IC or TPIC) outputting a touch driving signal of a pulse type (in other words, a touch driving signal of a pulse signal type; in still other words, a touch driving signal being a pulse signal) in accordance with a touch synchronization signal that defines a display driving period and a touch driving period, outputting a load free driving signal of the pulse type by using a gate low voltage signal of the at least one gate voltage signal, and outputting at least one pseudo touch driving signal corresponding to a pulse pattern of the touch driving signal and the load free driving signal and having reverse phase which is inverted, by using at least one gate high voltage signal of the at least one gate voltage signal, and a gate driving circuit supplying a gate pulse based on the at least one gate voltage signal to gate lines connected to the pixels for the display driving period, and supplying the load free driving signal to the gate lines for the touch driving period.

In accordance with one or more embodiments of the present disclosure, the above and other objects can be accomplished by the provision of a touch display apparatus comprising a display panel on which pixels and touch electrodes are disposed, a main power IC generating a common voltage signal applied to the touch electrodes and at least one gate voltage signal applied to the pixels, a touch power IC outputting a first touch driving signal of a pulse type (in other words, a first touch driving signal of a pulse signal type; in still other words, a first load free driving signal being a pulse signal) in accordance with a touch synchronization signal that defines a display driving period and a touch driving period, and outputting a first load free driving signal of the pulse type by using a gate low voltage signal of the at least one gate voltage signal, a signal converter outputting a pseudo touch driving signal by converting phase of the first load free driving signal, and a signal recovery unit disposed at an input front end of the pixels, recovering the first load free driving signal from the pseudo touch driving signal.

In accordance with some embodiments of the present disclosure, the above and other objects can be accomplished by the provision of a touch display apparatus comprising a display panel on which pixels and touch electrodes are disposed, a main power IC generating a common voltage signal applied to the touch electrodes and at least one gate voltage signal applied to the pixels, a touch power IC outputting a load free driving signal of a pulse type (in other words, a load free driving signal of a pulse signal type; in still other words, a load free driving signal being a pulse signal) in accordance with a touch synchronization signal that defines a display driving period and a touch driving period, and outputting the load free driving signal of the pulse type by using a gate low voltage signal of the at least one gate voltage signal, a gate driving circuit including a level shifter generating a gate pulse based on the at least one gate voltage signal and a shift register sequentially supplying the gate pulse output from the level shifter to gate lines connected to the pixels, and a gate signal selector disposed at an input front end of the shift register, supplying the gate pulse output from the level shifter to the shift register for the display driving period and supplying the load free driving signal to the shift register for the touch driving period.

In accordance with some embodiments of the present disclosure, the above and other objects can be accomplished by the provision of a touch display apparatus comprising a touch panel including a plurality of touch electrodes and a plurality of touch lines, a touch driving circuit sensing the plurality of touch electrodes through the plurality of touch lines, and a touch power circuit transferring a touch driving signal to the touch driving circuit through a touch signal line, wherein the touch power circuit may apply the touch driving signal to the touch signal line for a touch sensing period of the touch panel, and may apply a pseudo touch driving signal corresponding to a pulse (e.g., a pulse pattern) of the touch driving signal and having reverse phase which is inverted, to a pseudo touch signal line disposed to adjoin the touch signal line.

The touch display apparatus according to the present disclosure may effectively improve (or reduce) EMI level by using a reverse phase signal corresponding to the touch driving signal for touch driving.

Also, the touch display apparatus according to the present disclosure may effectively improve (or reduce) EMI level by removing a current field caused by a touch driving signal even without increasing additional lines or pins in the display panel or printed circuit board.

In addition to the effects of the present disclosure as mentioned above, additional advantages and features of the present disclosure will be clearly understood by those skilled in the art from the above description of the present disclosure.

BRIEF DESCRIPTION OF THE SEVERAL VIEWS OF THE DRAWINGS

The above and other objects, features and other advantages of the present disclosure will be more clearly understood from the following detailed description taken in conjunction with the accompanying drawings, in which.

DETAILED DESCRIPTION

Figure 1:
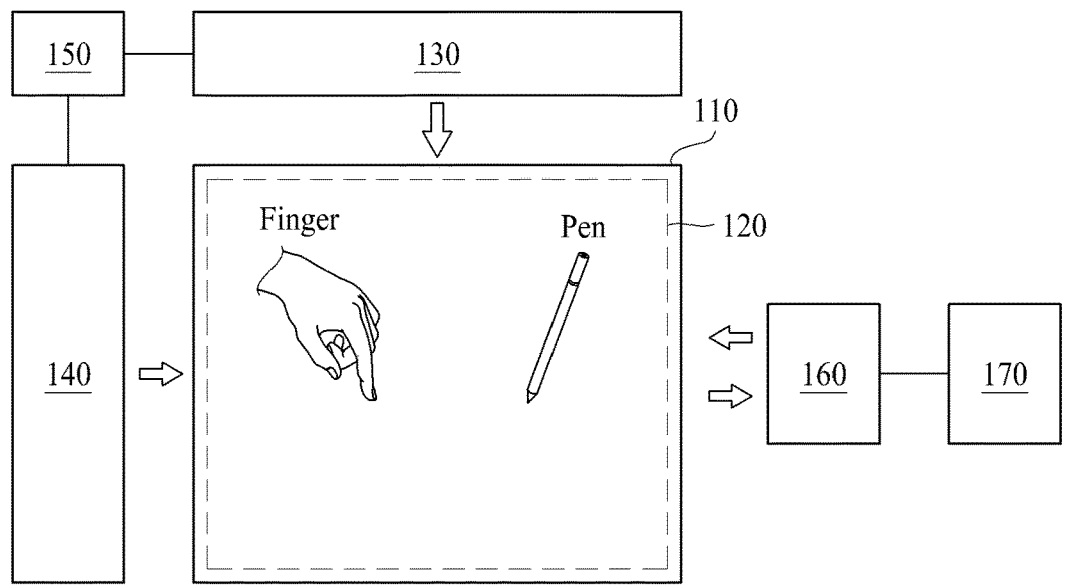
FIG. 1 is a schematic view illustrating a touch display apparatus according to various embodiments of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted.

In a case where 'comprise,' have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~,' 'above~,' 'below~,' and 'next to~,' one or more portions may be arranged between two other portions unless 'just' or 'direct' is used.

In describing a time relationship, for example, when the temporal order is described as 'after~,' 'subsequent~,' 'next~,' and 'before~,' a case which is not continuous may be included unless 'just' or 'direct' is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a preferred embodiment of a touch display apparatus according to the present disclosure will be described in detail with reference to the accompanying drawings. Wherever possible, the same reference numbers will be used throughout the drawings to refer to the same or like parts. Since a scale of each of elements shown in the accompanying drawings is different from an actual scale for convenience of description, the present disclosure is not limited to the shown scale.

Figure 2:
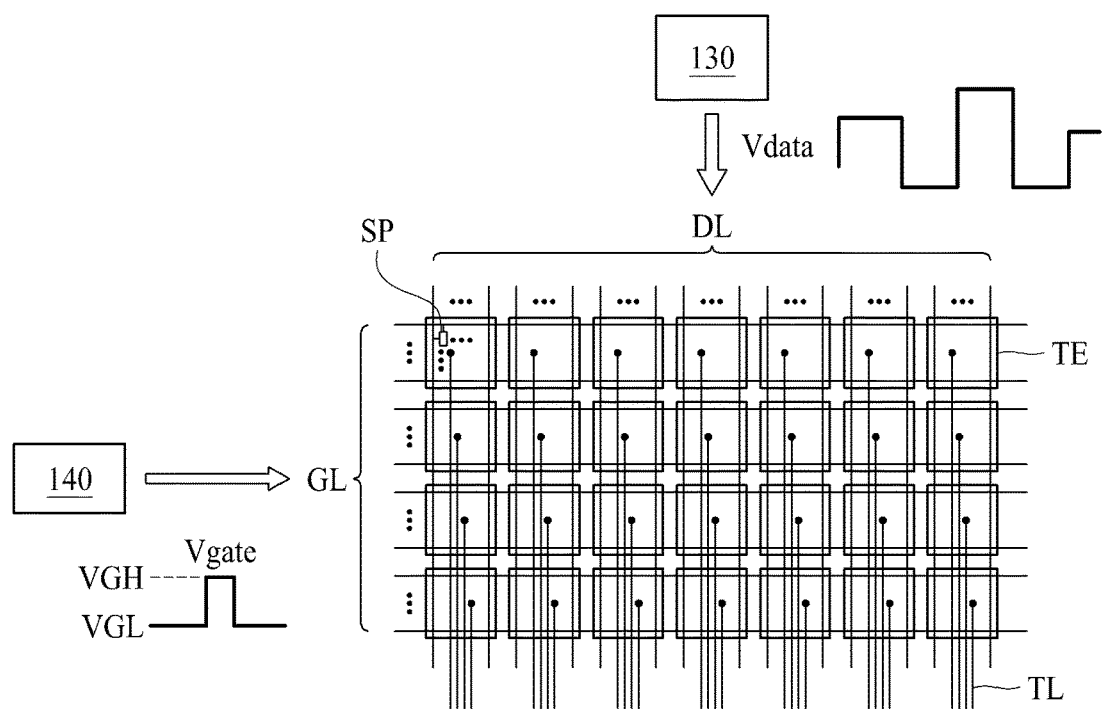
FIG. 2 is a view illustrating display driving of a touch display apparatus according to various embodiments of the present disclosure.
Figure 3:
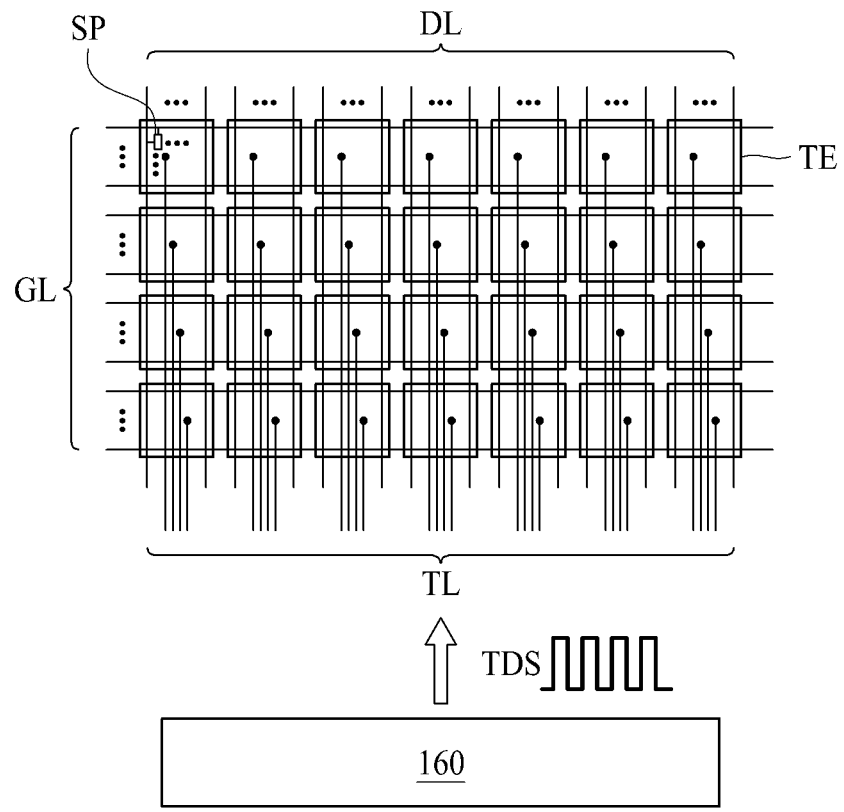
FIG. 3 is a view illustrating touch driving of a touch display apparatus according to various embodiments of the present disclosure.

FIG. 1 is a schematic view illustrating a touch display apparatus according to various embodiments of the present disclosure, FIG. 2 is a view illustrating display driving of a touch display apparatus according to various embodiments of the present disclosure, and FIG. 3 is a view illustrating touch driving of a touch display apparatus according to various embodiments of the present disclosure.

Referring to FIG. 1, the touch display apparatus according to various embodiments of the present disclosure may provide a display function for displaying an image. Also, the touch display apparatus according to various embodiments of the present disclosure may provide a touch sensing function of sensing a user's touch and a touch input function of performing an input processing based on the user's touch by using a touch sensing result.

Hereinafter, elements for providing an image display function and display driving will be described with reference to FIGS. 1 and 2, and elements for providing a touch sensing function and touch driving will be described with reference to FIGS. 1 and 3.

Referring to FIGS. 1 and 2, the touch display apparatus according to various embodiments of the present disclosure may include a display panel 110 on which a plurality of data lines DL and a plurality of gate lines GL may be disposed to provide an image display function and a plurality of sub-pixels SP defined by the data lines DL and the gate lines GL are disposed, a data driving circuit 130 electrically connected with the display panel 110, driving the data lines, a gate driving circuit 140 electrically connected with the display panel 110, driving the gate lines GL, and a timing controller 150 controlling the data driving circuit 130 and the gate driving circuit 140.

The timing controller 150 may control the data driving circuit 130 and the gate driving circuit 140 by supplying various control signals to the data driving circuit 130 and the gate driving circuit 140.

The timing controller 150 may start to scan in accordance with a timing embodied by each frame, convert externally input image data to data suitable for a data signal type used by the data driving circuit 130 to output the converted image data, and control data driving at a proper time suitable for scan.

The gate driving circuit 140 may sequentially supply gate signals of an on-voltage or an off-voltage to the gate lines GL under the control of the timing controller 150.

If a specific gate line GL is opened by the gate driving circuit 140, the data driving circuit 130 may convert the image data signal received from the timing controller 150 to an image analog signal to supply a data signal Vdata corresponding to the converted analog signal to the data lines DL.

The timing controller 150 may be embodied as a separate component separately from the data driving circuit 130, or may be embodied as an integrated circuit together with the data driving circuit 130.

The data driving circuit 130 may drive the data lines DL by supplying the data signal Vdata to the data lines DL. In this case, the data driving circuit 130 is referred to as a 'source driver.'

The data driving circuit 130 may include at least one source driver integrated circuit (SDIC). Each source driver integrated circuit SDIC may include a shift register, a latch circuit, a digital-to-analog converter (DAC), an output buffer circuit, etc. Each source driver integrated circuit SDIC may further include an analog-to-digital converter (ADC) as the case may be.

Each source driver integrated circuit may be connected to a bonding pad of the display panel 110 in a tape automated bonding (TAB) manner or a chip on glass (COG) manner, or may directly be disposed in the display panel 110. As the case may be, each source driver integrated circuit may be disposed to be integrated in the display panel 110. Also, each source driver integrated circuit may be embodied in a chip on film (COF) manner in which the source driver integrated circuit is packaged on a film connected to the display panel 110.

The gate driving circuit 140 may sequentially drive the gate lines GL by sequentially supplying scan signal Vgate (referred to as a scan voltage, a gate signal or a gate voltage signal) to the gate lines GL. In this case, the gate driving circuit 140 is referred to as a 'scan driver.'

In this case, the scan signal Vgate may include an off-level gate voltage that closes the corresponding gate line GL, and an on-level gate voltage that opens the corresponding gate line GL.

In detail, the scan signal Vgate may include an off-level gate voltage that turns off a transistor connected to the corresponding gate line GL and an on-level gate voltage that turns on a transistor connected to the corresponding gate line GL.

If the transistor is N type, the off-level gate voltage may be a gate low voltage VGL, and the on-level gate voltage may be a gate high voltage VGH.

Alternatively, if the transistor is P type, the off-level gate voltage may be a gate high voltage VGH, and the on-level gate voltage may be a gate low voltage VHL. Hereinafter, for convenience of description, a description will be given based on that the off-level gate voltage is a gate low voltage VGL, and the on-level gate voltage may be a gate high voltage VGH.

The gate driving circuit 140 may include at least one gate driver integrated circuit GDIC. Each gate driver integrated circuit GDIC may include a shift register, a level shifter, etc.

Each gate driver integrated circuit may be connected to a bonding pad of the display panel 110 in a tape automated bonding (TAB) manner or a chip on glass (COG) manner, or may be embodied in a gate in panel (GIP) type to be directly disposed in the display panel 110. As the case may be, each gate driver integrated circuit may be disposed to be integrated in the display panel 110. Also, each gate driver integrated circuit may be embodied in a chip on film (COF) manner in which the gate driver integrated circuit is packaged on a film connected to the display panel 110.

The data driving circuit 130, as shown in FIG. 1, may be disposed at only one side (e.g., upper side or lower side) of the display panel 110. As the case may be, the data driving circuit 130 may be disposed at both sides (e.g., upper side and lower side) of the display panel 110 in accordance with a panel design manner.

The gate driving circuit 140, as shown in FIG. 1, may be disposed at only one side (e.g., left side or right side) of the display panel 110. As the case may be, the gate driving circuit 140 may be disposed at both sides (e.g., left side and right side) of the display panel 110 in accordance with a driving manner and a panel design manner.

According to various embodiments of the present disclosure, the gate driving circuit 140 may include a level shifter and a gate in panel (GIP) circuit. The level shifter may be disposed between the timing controller 150 and the GIP circuit, and may be disposed together on a printed circuit board in which the timing controller 150 is disposed. The GIP circuit may directly be formed on a lower panel of the display panel 110 together with a TFT array.

The touch display apparatus according to various embodiments of the present disclosure may be a display apparatus of various types such as a liquid crystal display apparatus and an organic light emitting display apparatus. The display panel 110 according to various embodiments of the present disclosure may be a display panel of various types such as a liquid crystal display panel and an organic light emitting display panel.

Each subpixel SP arranged in the display panel 110 may include one or more circuit elements (e.g., transistor, capacitor, etc.).

For example, if the display panel 110 is a liquid crystal display panel, a pixel electrode may be disposed in each subpixel SP, and the transistor may electrically be connected between the pixel electrode and the data line DL. The transistor may be turned on by the scan signal Vgate supplied to a gate node through the gate line GL, output the data signal Vdata supplied to a source node (or drain node) through the data line DL to the drain node (or source node) during turn-on, and apply the data signal Vdata to the pixel electrode electrically connected to the drain node (or source node). An electric field may be formed between the pixel electrode to which the data signal Vdata is applied and a common electrode to which a common voltage Vcom is applied, and capacitance may be formed between the pixel electrode and the common electrode.

A structure of each subpixel SP may be determined in various manners such as a panel type, a function, a design manner, etc.

Referring to FIGS. 1 and 3, in order to provide a touch sensing function, the touch display apparatus according to various embodiments of the present disclosure may include a touch panel 120, a touch driving circuit 160 electrically connected with the touch panel 120, performing sensing by driving the touch panel 120, and a touch controller 170 sensing a touch by using a result obtained by the touch driving circuit 160 that has sensed the touch panel 120.

A touch based on a user's pointer may be in contact with or approach the touch panel 120. Touch electrodes TE may be disposed in the touch panel 120.

In this case, the user's pointer may be a finger or a pen.

The pen may be a passive pen having no signal transmission function or an active pen having a signal transmission function. The touch driving circuit 160 may supply a touch driving signal to the touch panel 120 and sense the touch panel 120. The touch controller 170 may sense a touch by using the result obtained by the touch driving circuit 160 that has sensed the touch panel 120. In this case, sensing a touch may mean that the presence of a touch and/or touch coordinates are determined.

The touch panel 120 may be an external type in which it is disposed outside the display panel 110, or may be an embedded type in which it is disposed inside the display panel 110.

If the touch panel 120 is an external type, the touch panel 120 and the display panel 110 may be coupled to each other by an adhesive after being separately manufactured. The external type touch panel 120 is referred to as an add-on type.

If the touch panel 120 is an embedded type, the touch panel 120 may be manufactured together with the display panel 110 during a process of manufacturing the display panel 110. That is, the touch electrodes TE constituting the touch panel 120 may be disposed inside the display panel 110. The embedded type touch panel 120 may be an in-cell type, an on-cell type, a hybrid type, etc.

Hereinafter, for convenience of description, it is assumed that the touch panel 120 is an embedded type in which it is disposed inside the display panel 110.

If the touch panel 120 is embedded in the display panel 110, that is, if a plurality of touch electrodes TE are disposed in the display panel 110, the plurality of touch electrodes TE may be disposed in the display panel 110 separately from electrodes used for display driving, or electrodes disposed in the display panel 110 may be used as a plurality of touch electrodes TE for display driving.

For example, a common electrode disposed in the display panel 110 may be divided into a plurality of electrodes, and thus the divided common electrodes may be used as the plurality of touch electrodes TE. That is, the plurality of touch electrodes TE disposed in the display panel 110 may be electrodes for touch sensing and electrodes for display driving. Hereinafter, it is assumed that the plurality of touch electrodes TE arranged in the display panel 110 are common electrodes.

The touch controller 170, for example, may be embodied as a micro controller (MCU), a processor, etc.

The timing controller 150 and the touch controller 170 may be embodied separately, or may be embodied integrally.

Referring to FIG. 3, a plurality of touch electrodes TE may be disposed in the touch panel 120 of the touch display apparatus according to various embodiments of the present disclosure, and a plurality of touch lines TL electrically connecting the plurality of touch electrodes TE with the touch driving circuit 160 may be disposed therein. One or more touch lines TL may electrically be connected to each touch electrode TE through one or more contact holes.

The touch display apparatus according to various embodiments of the present disclosure may sense a touch based on self-capacitance of the touch electrode TE or sense a touch based on mutual-capacitance.

When the touch display apparatus according to various embodiments of the present disclosure senses a touch based on self-capacitance, a plurality of first touch electrode lines and a plurality of second touch electrode lines may be arranged to cross each other in the touch panel 120. For example, the plurality of first touch electrode lines may be arranged in an X-axis direction and the plurality of second touch electrode lines may be arranged in a Y-axis direction. In this case, each of the first touch electrode line and the second touch electrode line may be a single touch electrode with a bar shape or may have a shape in which two or more touch electrodes are electrically connected to each other. The first touch electrode lines may be referred to as driving lines, driving electrodes, driving touch electrode lines, Tx lines, Tx electrodes, or Tx touch electrode lines. The second touch electrode lines may be referred to as receiving lines, receiving electrodes, receiving touch electrode lines, sensing lines, sensing electrode, sensing touch electrode lines, Rx lines, Rx electrodes, or Rx touch electrode lines.

In this case, the touch driving circuit 160 may supply a touch driving signal to one or more of the plurality of first touch electrode lines, sense the second touch electrode lines, and output sensing data. The touch controller 170 may calculate whether there is a touch and/or a touch coordinate using the sensing data.

When the touch display apparatus according to various embodiments of the disclosure senses a touch based on mutual-capacitance, a plurality of touch electrodes TE may be disposed to be spaced apart from one another in the touch panel 120 as shown in FIG. 3.

In this case, the touch driving circuit 160 may supply a touch driving signal TDS to all or some of the plurality of touch electrodes TE, sense one or more touch electrodes TE to which the touch driving signal has been supplied, and output sensing data. The touch controller 170 may calculate whether there is a touch and/or a touch coordinate using the sensing data.

In the following description, for convenience of description, it is assumed that the touch display apparatus according to various embodiments of the disclosure senses a touch based on self-capacitance and that the touch panel 120 is configured as shown in FIGS. 2 and 3.

The touch driving signal TDS which is output from the touch driving circuit 160 may be a signal of a constant voltage or may be a pulse type signal of a variable voltage.

When the touch driving signal TDS is a pulse type signal, the touch driving signal TDS may have various signal waveforms such as a sinusoidal waveform, a triangular waveform, or a square waveform.

Hereinafter, it is assumed that, when the touch driving signal TDS is a signal of a variable voltage, the touch driving signal TDS is a pulse signal of various pulses (in other words, a pulse type signal including various pulses). When the touch driving signal TDS is a pulse signal of various pulses, the touch driving signal TDS may have a constant frequency or may have a variable frequency.

Referring to FIGS. 2 and 3, the size of an area which is occupied by one touch electrode TE may correspond to the size of an area which is occupied by one subpixel SP or may correspond to the size of an area which is occupied by two or more subpixels SP.

A plurality of touch electrodes TE are arranged in one touch electrode array, and a plurality of touch lines TL which are electrically connected to the plurality of touch electrodes TE may overlap the plurality of touch electrodes TE. For example, when it is assumed that a plurality of touch electrodes TE arranged in one touch electrode array include a first touch electrode and a second touch electrode, a first touch line connected to the first touch electrode may overlap the second touch electrode but be electrically isolated from the second touch electrode.

Figure 4A:
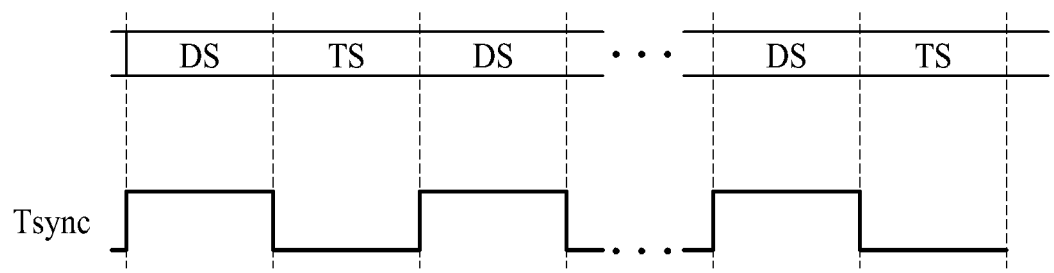
FIGS. 4A and 4B are waveforms illustrating a driving operation for a display driving period and a touch driving period.
Figure 4B:
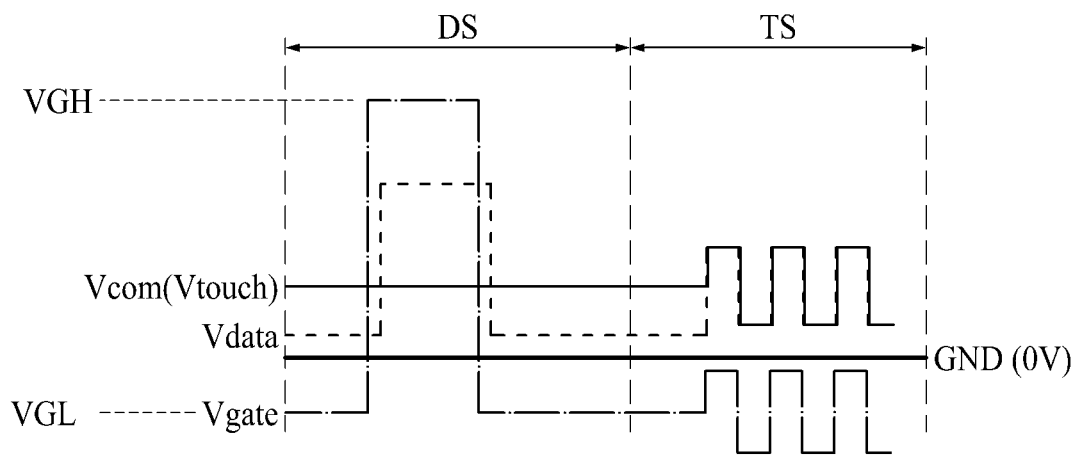

FIGS. 4A and 4B are waveforms illustrating a driving operation for a display driving period and a touch driving period.

Referring to FIG. 4A, the touch display apparatus according to various embodiments of the present disclosure may alternately perform display driving and touch driving. In this way, a system in which display driving for image display and touch driving for touch sensing are alternately performed is referred to as a time-division driving system.

According to the time-division driving system, a display driving period DS for image display and a touch driving period TS for touch sensing may alternate. The touch display apparatus may perform display driving for the display driving period DS. The touch display apparatus may perform touch driving for the touch driving period TS.

In this case, timing of the display driving period DS and the touch driving period TS may be controlled by a touch synchronization signal Tsync. That is, the touch synchronization signal Tsync may be used as a signal for defining the touch driving period TS and the display driving period DS together.

A common voltage which is a direct current (DC) voltage may be applied to the plurality of touch electrodes TE for the display driving period DS. In this case, the common voltage may be a voltage that forms an electric field and a pixel voltage applied to a pixel electrode within each subpixel.

For the touch driving period TS, the touch driving signal TDS may be applied to all or some of the plurality of touch electrodes TE. The touch driving signal TDS may be a variable pulse type signal. At this time, the data lines DL and the gate lines GL may not be driven.

In this case, unnecessary parasitic capacitance due to a potential difference may be formed between a touch electrode TE to which the touch driving signal TDS is applied and one or more data lines DL or gate lines located in the vicinity thereof. To reduce this unnecessary parasitic capacitance, the touch driving signal TDS or a signal corresponding thereto may be applied to all or some of the data lines DL. Also, the touch driving signal TDS or a signal corresponding thereto may be applied to all or some of the gate lines GL.

Referring to FIG. 4B, in the touch display apparatus, pixel driving signals Vcom, Vdata and Vgate may be supplied to pixels for the display driving period DS. Vcom is a common voltage signal applied to the touch electrode TE, that is, the common electrode through the touch line TL for the display driving period DS. Vdata is a data voltage of an input image supplied to the data lines DL for the display driving period DS. Vgate may be a gate voltage signal supplied to the gate lines GL for the display driving period DS. For the touch driving period TS, as shown in FIG. 4B, a load-free driving signal based on the common voltage Vcom may be applied to the data line DL, the gate line GL and the touch line TL. The touch driving signal and the load-free driving signal may drive the touch electrodes TE and minimize or reduce parasitic capacitance between the pixels and the touch electrodes TE. For example, the load-free driving signal based on the common voltage Vcom may be applied to the touch electrode TE or the data lines without being used for sensing. At this time, the touch driving signal and the load-free driving signal, which are applied to the touch electrode TE for sensing, are signals output to the same source, and may be pulse signals swinging at the same phase and the same amplitude.

In the touch display apparatus, if at least one of the plurality of touch electrodes TE is sequentially driven using the touch driving signal of a pulse type of a single frequency (e.g., several tens of KHz to several hundreds of KHz) for the touch driving period TS, a voltage level of the touch driving signal is changed, whereby electromagnetic interference (EMI) may be generated.

Particularly, in the touch display apparatus, at least one of the plurality of touch electrodes are sequentially driven using the touch driving signal of a single frequency pulse type for the touch driving period TS, and at this time, if a load-free driving signal is applied to at least one of the data line DL and the gate line GL, EMI due to the touch driving signal may be generated more seriously.

In this regard, to solve the problem, the inventors of the present disclosure have invented a touch display apparatus that may effectively improve (or reduce) EMI level using a reverse phase signal corresponding to the touch driving signal for touch driving.

Hereinafter, the touch display apparatus that may effectively improve (or reduce) EMI level will be described in accordance with various embodiments of the present disclosure.

Figure 5:
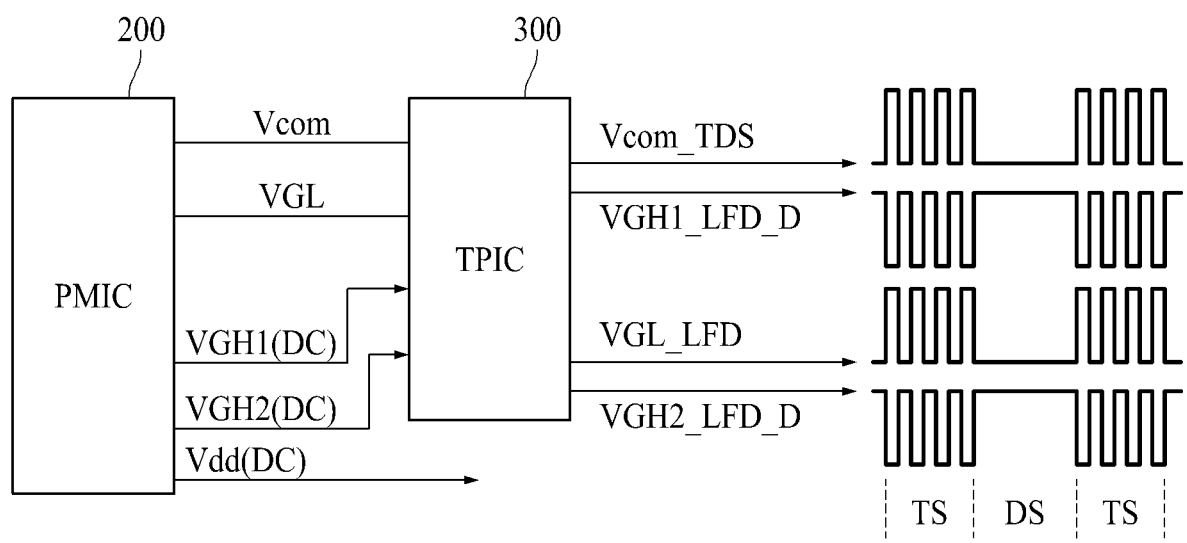
FIG. 5 is a view illustrating a touch driving operation in a touch display apparatus according to one embodiment of the present disclosure.
Figure 6:
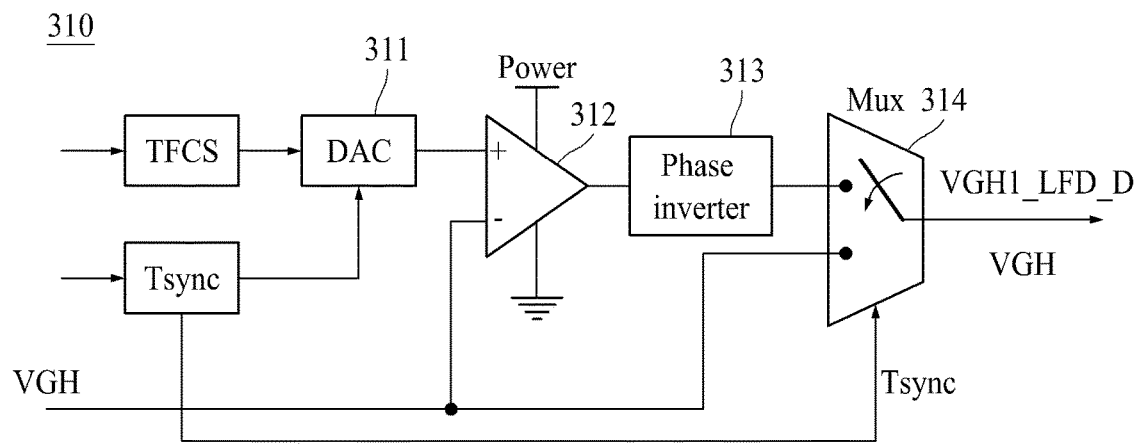
FIG. 6 is a view illustrating a reverse phase inversion circuit in a touch display apparatus according to one embodiment of the present disclosure.
Figure 7:
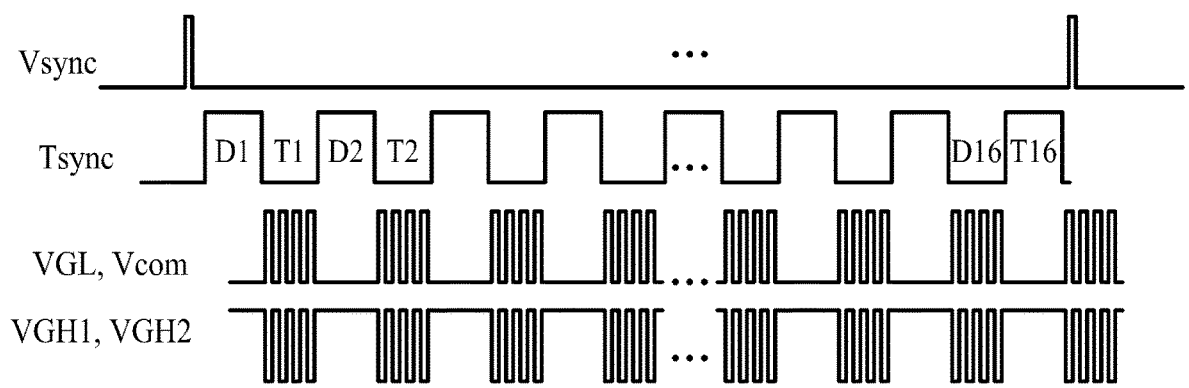
FIG. 7 is a waveform illustrating a touch driving operation in a touch display apparatus according to one embodiment of the present disclosure.
Figure 8:
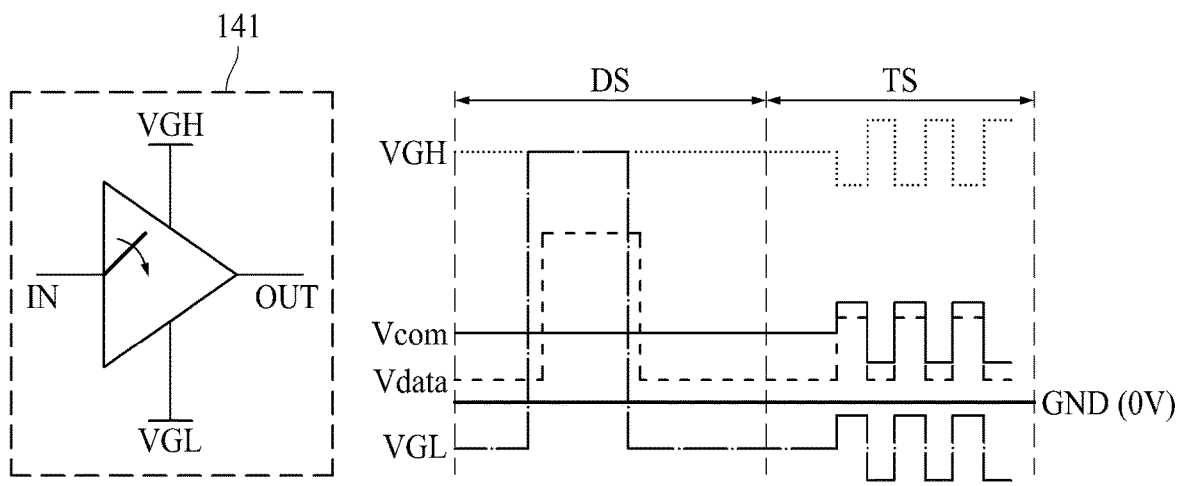
FIG. 8 is a view illustrating a touch driving operation in a touch display apparatus according to one embodiment of the present disclosure.

FIG. 5 is a view illustrating a touch driving operation in a touch display apparatus according to one embodiment of the present disclosure, FIG. 6 is a view illustrating a reverse phase inversion circuit in a touch display apparatus according to one embodiment of the present disclosure, FIG. 7 is a waveform illustrating a touch driving operation in a touch display apparatus according to one embodiment of the present disclosure, and FIG. 8 is a view illustrating a touch driving operation in a touch display apparatus according to one embodiment of the present disclosure.

Referring to FIGS. 5 to 8 in connection with FIGS. 1 to 3, the touch display apparatus according to one embodiment of the present disclosure may include a touch power IC (TPIC) 300 for power supply for touch sensing, and a main power IC (PMIC) 200.

The main power IC 200 may generate a common voltage Vcom, a gate low voltage VGL, a first gate high voltage VGH1, a second gate high voltage VGH2, and a high potential driving voltage Vdd. The main power IC 200 may supply various DC voltages (e.g., Vcom, VGL, VGH1, VGH2, etc.) required for signal supply of the touch power IC 300 to the touch power IC 300.

The main power IC 200 may supply various DC voltages (e.g., Vdd, etc.) required for data driving of the data driving circuit 130 to the data driving circuit 130.

The touch power IC 300 may receive the common voltage Vcom, the gate low voltage VGL, the gate high voltage VGH1 and the second gate high voltage VGH2 of the DC voltages from the main power IC 200. The gate low voltage VGL is a voltage capable of turning off the TFTs included in the display panel 110, and the first or second gate high voltage VGH1 or VGH2 is a voltage capable of turning on the TFTs. The touch power IC 300 may supply the touch driving signal required for driving of the touch electrodes TE to the touch driving circuit 160 and the gate driving circuit 140.

Referring to FIG. 5, the touch power IC 300 of the touch display apparatus according to one embodiment of the present disclosure may generate a load-free driving signal VGL_LFD of a pulse type (in other words, of a pulse signal type, in still other words, being a pulse signal) by using the gate low voltage VGL applied from the main power IC 200 in accordance with the touch synchronization signal Tsync that defines the display driving period DS and the touch driving period TS. Also, the touch power IC 300 may generate a touch driving signal Vcom_TDS of the pulse type by using the common voltage Vcom applied from the main power IC 200 in accordance with the touch synchronization signal Tsync. Also, the touch power IC 300 may generate pseudo touch driving signals VGH1_LFD_D and VGH2_LFD_D, which correspond to a pulse pattern of the touch driving signal Vcom_TDS and load-free driving signal VGL_LFD that have a reverse phase which is inverted (e.g., 180 degrees out of phase), by using the first and second gate high voltages VGH1 and VGH2 applied from the main power IC 200 in accordance with the touch synchronization signal Tsync. For example, the load-free driving signal VGL_LFD based on the gate low voltage VGL may be a pulse signal swinging at the same phase and the same amplitude as those of the touch driving signal Vcom_TDS. The load-free driving signal VGL_LFD which will be applied to the gate line GL may be a pulse signal swinging at a level lower than that of the touch driving signal Vcom_TDS because a transistor diode in a pixel should maintain a turn-off state. For example, the load-free driving signal VGL_LFD may be a signal having an amplitude from −15V to −11V, and the touch driving signal Vcom_TDS may be a signal having an amplitude from 1V to 5V. In this case, the load-free driving signal VGL_LFD and the touch driving signal Vcom_TDS have a pulse amplitude of 4V of different voltage levels. According to one embodiment of the present disclosure, the touch power IC 300 may generate the touch driving signal Vcom_TDS and the load free driving signal VGL_LFD based on the touch pulse control signal TFCS for touch sensing and the touch synchronization signal Tsync. For example, the touch pulse control signal may include at least one of a beacon signal, a ping signal, and a load free driving (LFD) signal. The beacon signal is intended to acquire a touch coordinate of a user's pointer, and may be a pulse signal of about 7V (e.g., having an amplitude of about 7V). The ping signal is intended for mutual transmission and reception of a signal when a pen among the user's pointers is an active pen having a signal transmission and reception function, and may be a pulse signal of about 7V (e.g., having an amplitude of about 7V). Also, the LFD signal is intended to reduce an influence of parasitic capacitance on a touch sensing result during touch sensing, and may be a pulse signal of about 3V (e.g., having an amplitude of about 3V).

The touch power IC 300 may generate a signal having a single pulse width by synthesizing the beacon signal, the ping signal or the LFD signal included in the touch pulse control signal, or may generate the beacon signal, the ping signal or the LFD signal as a signal having a plurality of pulse widths arranged in a time-division manner for a period when the touch driving signal is output.

The load free driving signal VGL_LFD generated by the touch power IC 300 may be applied to the plurality of gate lines GL disposed in the display panel 110 through the gate driving circuit 140. Also, the touch driving signal Vcom_TDS generated by the touch power IC 300 may be applied to the plurality of touch electrodes TE through the plurality of touch lines TL. The load free driving signal VGL_LFD and the touch driving signal Vcom_TDS may have pulse patterns having the same frequency, the same amplitude and the same phase, whereby an influence of parasitic capacitance on the touch sensing result in the touch electrode TE may be reduced.

Meanwhile, although the touch display apparatus according to one embodiment of the present disclosure may minimize or reduce an influence of parasitic capacitance by using the load free driving signal VGL_LFD and the touch driving signal Vcom_TDS, which are synchronized with each other, a current field may be caused between the load free driving signal VGL_LFD and the touch driving signal Vcom_TDS for a period when the load free driving signal VGL_LFD and the touch driving signal Vcom_TDS are applied to the gate lines GL and the touch electrode TE, whereby EMI may be generated.

In the touch display apparatus according to one embodiment of the present disclosure, to reduce an influence of such EMI, the touch power IC 300 may generate the load free driving signal VGL_LFD and the touch driving signal Vcom_TDS, and may generate pseudo touch driving signals corresponding to the pulse patterns of the touch driving signal and the load-free driving signal and having reverse phase which is inverted. The first and second gate high voltages VGH1 and VGH2 which are not used for touch sensing during touch operation may be used for generation of the pseudo touch driving signals. The first gate high voltage VGH1 may have a voltage level higher than that of the second gate high voltage VGH2.

The touch power IC 300 may receive the first and second gate high signals VGH1 and VGH2 from the main power IC 200, convert the first and second gate high signals VGH1 and VGH2 to the pulse signals corresponding to the pulse patterns of the load free driving signal VGL_LFD and the touch driving signal Vcom_TDS, and generate a first pseudo touch driving signal VGH1_LFD_D and a second pseudo touch driving signal VGH2_LFD_D, which have reverse phase by inverting the phase of the converted signal (e.g., 180 degrees out of phase). As shown in FIG. 5, the load free driving signal VGL_LFD and the touch driving signal Vcom_TDS, which are output from the touch power IC 300, and the first and second pseudo touch driving signals VGH1_LFD_D and VGH2_LFD_D may mutually be inverted for phase while having the same frequency and the same amplitude. The load free driving signal VGL_LFD and the first touch driving signal Vcom_TDS, which are output from the touch power IC 300, and the first pseudo touch driving signal VGH1_LFD_D may be applied to the display panel 110 through power lines arranged to adjoin each other in the form of a pair. Also, the touch driving signal Vcom_TDS and the second pseudo touch driving signal VGH2_LFD_D may be applied to the display panel 110 through power lines arranged to adjoin each other in the form of a pair.

Referring to FIG. 6, the touch power IC 300 may include a reverse phase inversion circuit 310 therein. The reverse phase inversion circuit 310 may include a digital-to-analog converter (DAC) 311, an amplifier 312, a phase inverter 313, and a multiplexer (Mux) 314, and convert the gate high voltage VGH to the pseudo touch driving signal based on the touch pulse control signal TFCS and the touch synchronization signal Tsync. The reverse phase inversion circuit 310 may change the analog signal changed from the touch pulse control signal TFCS through the DAC and the gate high voltage VGH applied from the main power IC 200 to pulse type signals through an amplifier and generate a pseudo touch driving signal VGH_LFD_D having a reverse phase which is inverted by the phase inverter 313 from the changed signal (e.g., 180 degrees out of phase). The multiplexer 314 may output the original gate high voltage VGH for the display driving period DS and output the pseudo touch driving signal VGH_LFD_D for the touch driving period TS, based on the touch driving signal Tsync.

Referring to FIG. 7, in the touch display apparatus according to one embodiment of the present disclosure, a plurality of display driving operations D1 to D16 and a plurality of touch driving operations T1 to T16 may be performed alternately in accordance with a touch synchronization signal Tsync defining the display driving period DS and the touch driving period TS for one frame period based on the vertical synchronization signal Vsync. For each of the touch driving operations T1 to T16, the touch driving signals converted from the gate low voltage VGL and the common power Vcom may be output as positive pulse signals, and the pseudo touch driving signals converted from the first and second gate high voltages VGH1 and VGH2 may be output as negative pulse signals opposite to the positive pulse signals.

The touch display apparatus according to one embodiment of the present disclosure may include a gate driving circuit 140. The gate driving circuit 140 may include a switching element 141 switching for an externally applied signal. As shown in FIG. 8, the switching element 141 may selectively output the gate high voltage VGH and the gate low voltage VGL. The gate driving circuit 140 may control the switching element 141 to supply the gate high voltage VGH to the gate lines GL for the display driving period DS, and may control the switching element 141 to supply the gate low voltage VGL to the gate lines GL for the touch driving period TS. That is, for the touch driving period TS, the common voltage Vcom, the data voltage Vdata, and the gate low voltage VGL may output signals of pulse patterns in accordance with a pulse touch control signal. On the other hand, the gate high voltage VGH is turned off by the switching element 141, whereby the gate high voltage VGH may not be supplied to the gate lines for the touch driving period TS, and may not affect touch driving.

Figure 9:
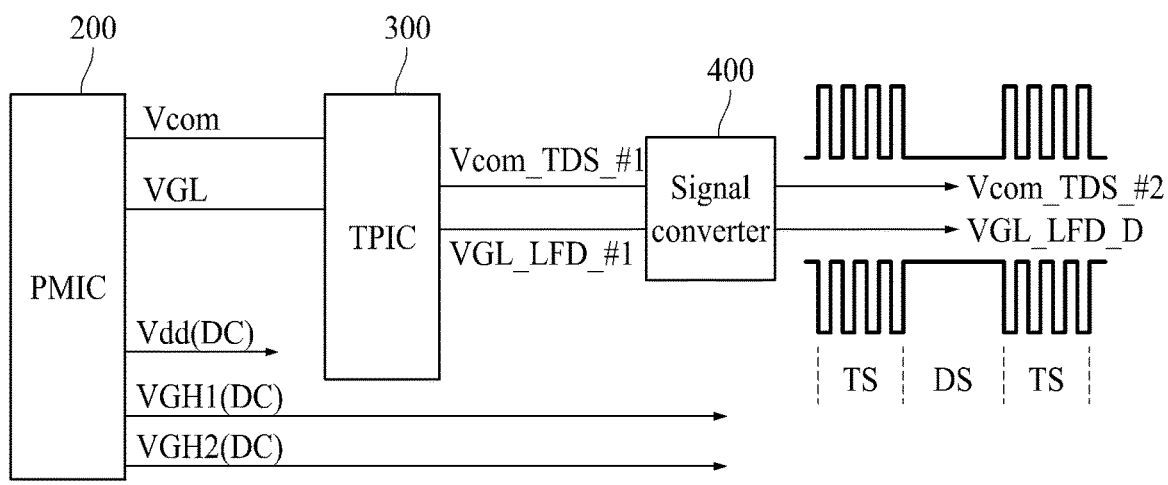
FIG. 9 is a view illustrating a touch driving operation in a touch display apparatus according to another embodiment of the present disclosure.
Figure 10:
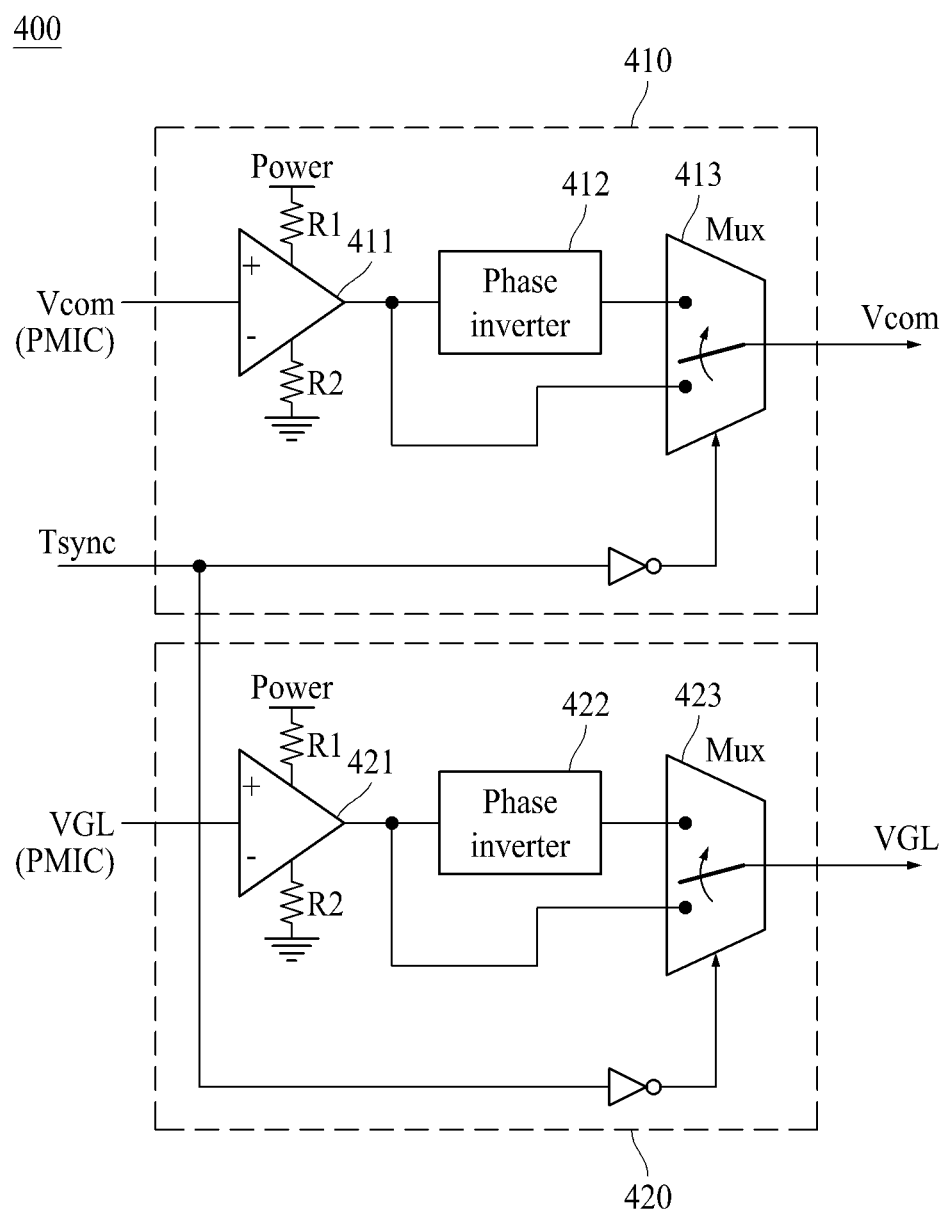
FIG. 10 is a view illustrating a signal converter in a touch display apparatus according to another embodiment of the present disclosure.
Figure 11:
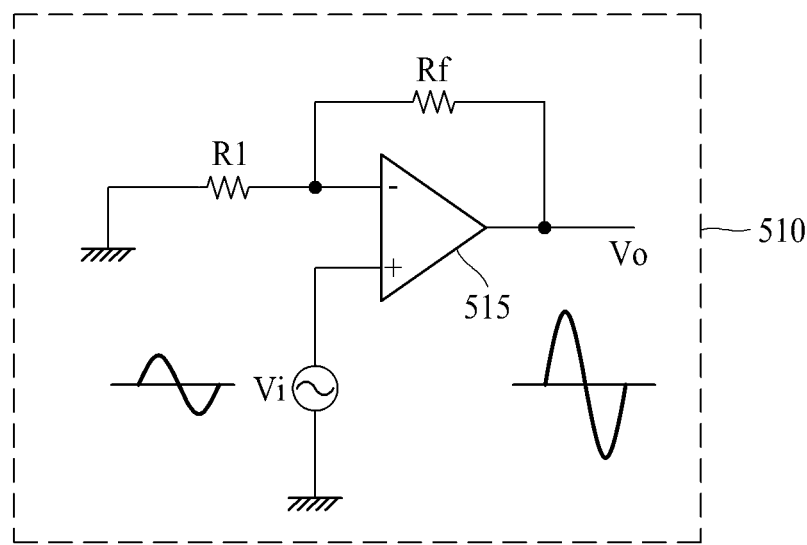
FIG. 11 is a view illustrating a signal recovery unit in a touch display apparatus according to another embodiment of the present disclosure.
Figure 11:
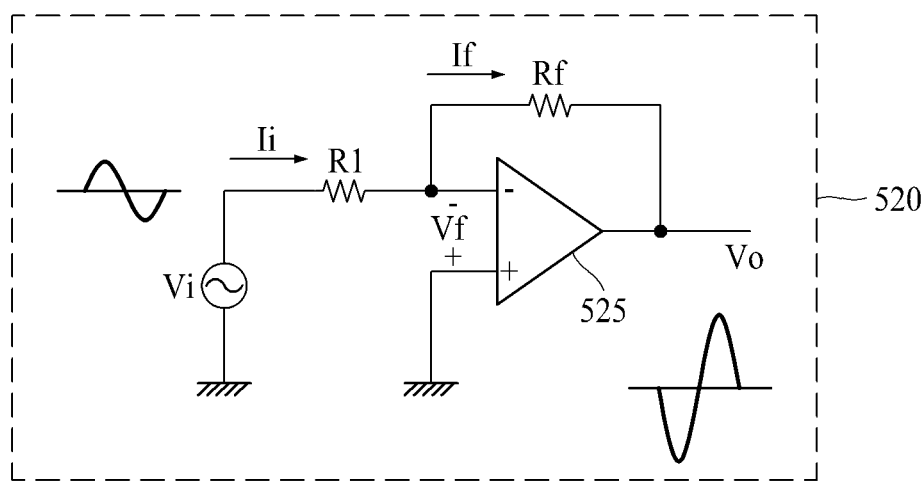

FIG. 9 is a view illustrating a touch driving operation in a touch display apparatus according to another embodiment of the present disclosure, FIG. 10 is a view illustrating a signal converter in a touch display apparatus according to another embodiment of the present disclosure, and FIG. 11 is a view illustrating a signal recovery unit in a touch display apparatus according to another embodiment of the present disclosure.

Referring to FIGS. 9 to 11 in connection with FIGS. 1 to 3, the touch display apparatus according to another embodiment of the present disclosure may include a main power IC 200, a touch power IC 300, a signal converter 400, and a signal recovery unit 500.

The main power IC 200 may generate a common voltage Vcom, a gate low voltage VGL, a first gate high voltage VGH1, a second gate high voltage VGH2, and a high potential driving voltage Vdd. The main power IC 200 may supply various DC voltages (e.g., Vcom, VGL, VGH1, VGH2, etc.) required for signal supply of the touch power IC 300 to the touch power IC 300.

The main power IC 200 may supply various DC voltages (e.g., Vdd, etc.) required for data driving of the data driving circuit 130 to the data driving circuit 130.

The touch power IC 300 may receive the common voltage Vcom and the gate low voltage VGL of the DC voltages from the main power IC 200. The gate low voltage VGL is a voltage capable of turning off the TFTs included in the display panel 110. The touch power IC 300 may supply the touch driving signal required for driving of the touch electrodes TE to the touch driving circuit 160 and the gate driving circuit 140.

The signal converter 400 may serve to convert a voltage level and phase for the signal output from the touch power IC 300.

The signal recovery unit 500 may be disposed at a front end of a signal input terminal to subpixels P in the display panel 110, and may serve to recover the signal converted by the signal converter 400 to the original signal.

Referring to FIG. 9, the touch power IC 300 of the touch display apparatus according to another embodiment of the present disclosure may generate a first load-free driving signal VGL_LFD_#1 of a pulse type (in other words, of a pulse signal type, in still other words, being a pulse signal) by using the gate low voltage VGL applied from the main power IC 200 in accordance with the touch synchronization signal Tsync that defines the display driving period DS and the touch driving period TS. Also, the touch power IC 300 may generate a first touch driving signal Vcom_TDS_#1 of the pulse type by using the common voltage Vcom applied from the main power IC 200 in accordance with the touch synchronization signal Tsync.

The signal converter 400 may generate a pseudo touch driving signal VGL_LFD_D by dropping a voltage level of the first load free driving signal VGL_LFD_#1 applied from the touch power IC 300 and phase-inverting the signal of which voltage level has been dropped, in accordance with the touch synchronization signal. Also, the signal converter 400 may generate a second touch driving signal Vcom_TDS_#2 by dropping the voltage level of the first touch driving signal Vcom_TDS_#1 applied from the touch power IC 300 in accordance with the touch synchronization signal Tsync.

According to another embodiment of the present disclosure, the touch power IC 300 may generate the first load free driving signal VGL_LFD_#1 and the first touch driving signal Vcom_TDS_#1 based on the touch synchronization signal Tsync and a touch pulse control signal TFCS for touch sensing. For example, the touch pulse control signal may include at least one of a beacon signal, a ping signal, and a load free driving (LFD) signal. The beacon signal is intended to acquire a touch coordinate of a user's pointer, and may be a pulse signal of about 7V (e.g., having an amplitude of about 7V). The ping signal is intended for mutual transmission and reception of a signal when a pen among the user's pointers is an active pen having a signal transmission and reception function, and may be a pulse signal of about 7V (e.g., having an amplitude of about 7V).

Also, the LFD signal is intended to reduce an influence of parasitic capacitance on a touch sensing result during touch sensing, and may be a pulse signal of about 3V (e.g., having an amplitude of about 3V).

The touch power IC 300 may generate a signal having a single pulse width by synthesizing the beacon signal, the ping signal or the LFD signal included in the touch pulse control signal, or may generate the beacon signal, the ping signal or the LFD signal as a signal having a plurality of pulse widths arranged in a time-division manner for a period when the touch driving signal is output.

The first load free driving signal VGL_LFD_#1 and the first touch driving signal Vcom_TDS_#1 generated by the touch power IC 300 may be applied to the plurality of gate lines GL disposed in the display panel 110 through the signal converter 400, and the first load free driving signal VGL_LFD_#1 may be applied to the plurality of gate lines GL disposed in the display panel 110 through the gate driving circuit 140. The first touch driving signal may be applied to the plurality of touch electrodes TE through the plurality of touch lines TL. The first load free driving signal VGL_LFD_#1 and the first touch driving signal Vcom_TDS_#1 may have pulse patterns having the same frequency, the same amplitude and the same phase, whereby an influence of parasitic capacitance on the touch sensing result in the touch electrode TE may be reduced.

Meanwhile, although the touch display apparatus according to another embodiment of the present disclosure may minimize or reduce an influence of parasitic capacitance by using the first load free driving signal VGL_LFD_#1 and the first touch driving signal Vcom_TDS_#1, which are synchronized with each other, a current field may be caused between the first load free driving signal VGL_LFD_#1 and the first touch driving signal Vcom_TDS_#1 for a period when the first load free driving signal VGL_LFD_#1 and the first touch driving signal Vcom_TDS_#1 are applied to the gate lines GL and the touch electrode TE, whereby EMI may be generated.

In the touch display apparatus according to another embodiment of the present disclosure, to reduce an influence of such EMI, the touch power IC 300 may generate the first load free driving signal VGL_LFD_#1 and the first touch driving signal Vcom_TDS_#1, and the signal converter 400 may convert any one of the first load free driving signal VGL_LFD_#1 and the first touch driving signal Vcom_TDS_#1 to a pseudo touch driving signal having reverse phase which is inverted while having a pulse pattern corresponding to another one of the driving signals (e.g., 180 degrees out of phase).

Referring to FIG. 10, the signal converter 400 may include a first signal conversion circuit 410 and a second signal conversion circuit 420. The first signal conversion circuit 410 may process a signal of the common voltage Vcom applied from the touch power IC 300. The second signal conversion circuit 420 may process a signal of the gate low voltage VGL applied from the touch power IC 300.

The first signal conversion circuit 410 may include a voltage drop 411 that may drop a voltage level, a phase inverter 412, and a multiplexer (Mux) 413. The first signal conversion circuit 410 may receive the first touch driving signal Vcom_TDS_#1, which is pulse-converted from the common voltage Vcom, from the touch power IC 300. The first signal conversion circuit 410 may generate a second touch driving signal Vcom_TDS_#2 by dropping the voltage level of the first touch driving signal Vcom_TDS_#1 through the voltage drop 411. The second touch driving signal Vcom_TDS_#2 may be generated as a pseudo touch driving signal having reverse phase which is inverted through the phase inverter 412 (e.g., 180 degrees out of phase). The multiplexer 413 may output the pseudo touch driving signal converted from the second touch driving signal Vcom_TDS_#2 based on the touch synchronization signal Tsync, or may output the second touch driving signal Vcom_TDS_#2 by bypassing the phase inverter 412. That is, the first signal conversion circuit 410 may output the first touch driving signal Vcom_TDS_#1 using the common voltage Vcom as the second touch driving signal Vcom_TDS_#2 that drops only the voltage level, or may output the pseudo touch driving signal through the voltage level and phase inversion.

The second signal conversion circuit 420 may include a voltage drop 421 that may drop a voltage level, a phase inverter 422, and a multiplexer (Mux) 423. The second signal conversion circuit 420 may receive the first load free driving signal VGL_LFD_#1, which is pulse-converted from the gate low voltage VGL, from the touch power IC 300. The second signal conversion circuit 420 may generate a pseudo touch driving signal VGL_LFD_D by dropping the voltage level of the first load free driving signal VGL_LFD_#1 through the voltage drop 421 and inverting phase for the signal of which voltage level has been dropped, through the phase inverter 422. The second signal conversion circuit 420 may output the first load free driving signal VGL_LFD_#1 by dropping only the voltage level without inverting phase for the first load free driving signal VGL_LFD_#1. That is, the second signal conversion circuit 420 may output the first load free driving signal VGL_LFD_#1 using the gate low voltage VGL as the pseudo touch driving signal VGL_LFD_D of which voltage level has been dropped and phase has been inverted, or may output the second load free driving signal that drops only the voltage level.

The pseudo touch driving signal VGL_LFD_D and the second touch driving signal Vcom_TDS_#2, which are output from the signal converter 400, may be applied to the display panel 110 through power lines disposed to adjoin each other in the form of a pair.

Referring to FIG. 11, the signal recovery unit 500 may include a first signal recovery circuit 510 and a second signal recovery circuit 520. The first and second signal recovery circuits 510 and 520 may be output from the signal converter 400 and serve to recover the converted signal, which has passed through a power lines surrounding a bezel area of the display panel 110, to the original signal before the converted signal is applied to the display panel 110.

The first signal recovery circuit 510 includes a non-inversion amplification circuit that includes a voltage amplifier 515 to amplify the second touch driving signal Vcom_TDS_#2 output from the signal converter 400 through non-inversion, thereby recovering the first touch driving signal Vcom_TDS_#1. The recovered first touch driving signal Vcom_TDS_#1 may be applied to a plurality of touch electrodes TE through a plurality of touch lines TL.

The second signal recovery circuit 520 includes an inversion amplification circuit that includes a voltage amplifier 525 to amplify the pseudo touch driving signal VGL_LFD_D output from the signal converter 400 through inversion, thereby recovering the first load free driving signal VGL_LFD_#1. The recovered first load free driving signal VGL_LFD_#1 may be applied to the plurality of gate lines GL disposed in the display panel 110 through the gate driving circuit 140.

Figure 12:
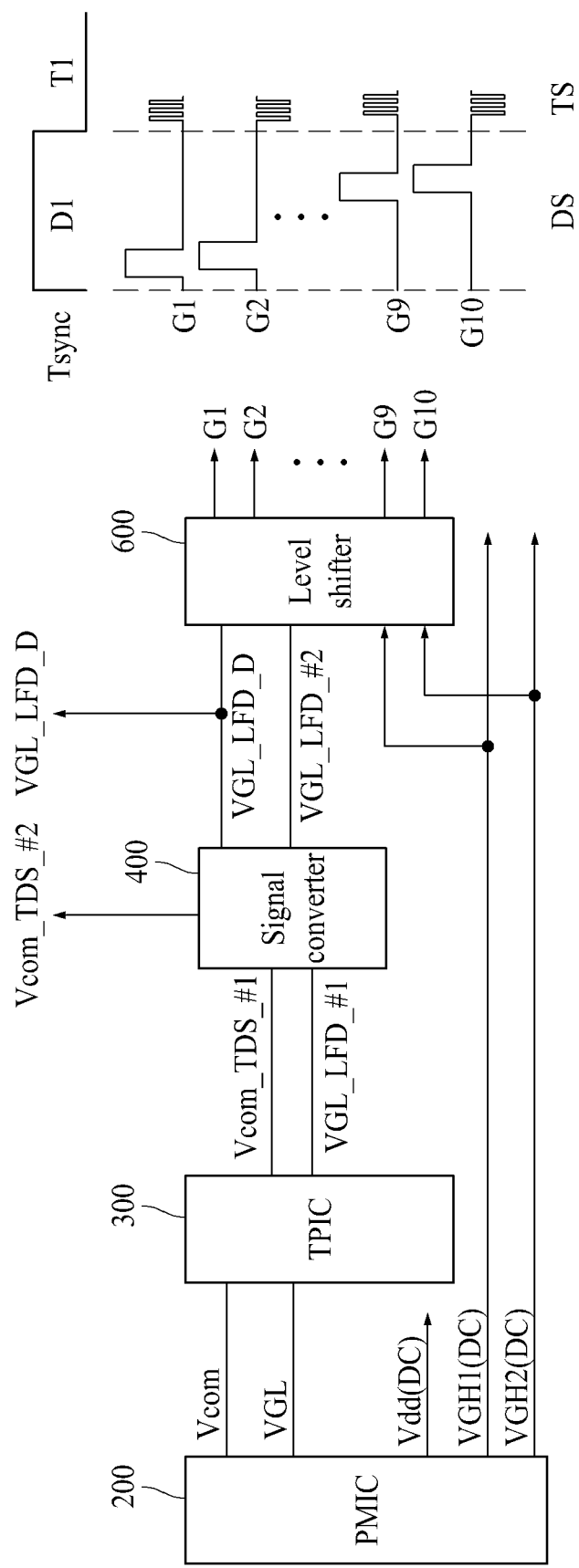
FIG. 12 is a view illustrating a touch driving operation in a touch display apparatus according to still another embodiment of the present disclosure.
Figure 13:
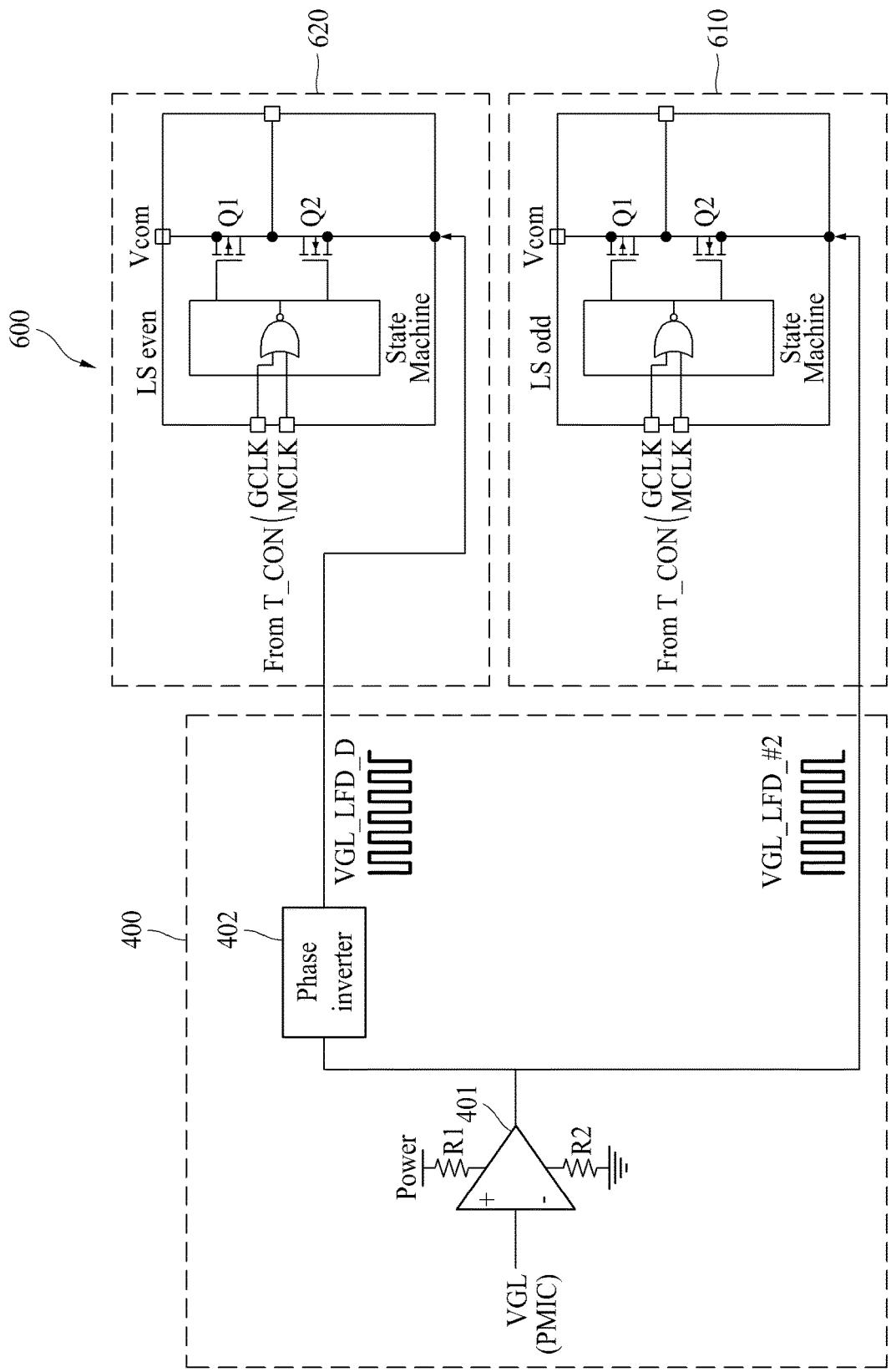
FIG. 13 is a view illustrating a signal converter and a level shifter in a touch display apparatus according to still another embodiment of the present disclosure.

FIG. 12 is a view illustrating a touch driving operation in a touch display apparatus according to still another embodiment of the present disclosure, and FIG. 13 is a view illustrating a signal converter and a level shifter in a touch display apparatus according to still another embodiment of the present disclosure.

Referring to FIGS. 12 and 13 in connection with FIGS. 1 to 3, the touch display apparatus according to still another embodiment of the present disclosure may include a main power IC 200, a touch power IC 300, a signal converter 400, and a level shifter 600.

The main power IC 200 may generate a common voltage Vcom, a gate low voltage VGL, a first gate high voltage VGH1, a second gate high voltage VGH2, and a high potential driving voltage Vdd. The main power IC 200 may supply various DC voltages (e.g., Vcom, VGL, VGH1, VGH2, etc.) required for signal supply of the touch power IC 300 to the touch power IC 300.

The main power IC 200 may supply various DC voltages (e.g., Vdd, etc.) required for data driving of the data driving circuit 130 to the data driving circuit 130.

The touch power IC 300 may receive the common voltage Vcom and the gate low voltage VGL of the DC voltages from the main power IC 200. The gate low voltage VGL is a voltage capable of turning off the TFTs included in the display panel 110. The touch power IC 300 may supply the touch driving signal required for driving of the touch electrodes TE to the touch driving circuit 160 and the gate driving circuit 140.

The signal converter 400 may serve to convert a voltage level and phase for the signal output from the touch power IC 300.

The level shifter 600 may be a partial element of the gate driving circuit 140, and may generate a gate pulse based on a signal applied through the main power IC 200, the touch power IC 300 and the signal converter 400. The gate pulse output from the level shifter 600 may be supplied to the shift register.

Referring to FIG. 12, the touch power IC 300 of the touch display apparatus according to still another embodiment of the present disclosure may generate a first load free driving signal VGL_LFD_#1 of a pulse type (in other words, of a pulse signal type, in still other words, being a pulse signal) by using the gate low voltage VGL applied from the main power IC 200 in accordance with the touch synchronization signal Tsync that defines the display driving period DS and the touch driving period TS. Also, the touch power IC 300 may generate a first touch driving signal Vcom_TDS_#1 of the pulse type by using the common voltage Vcom applied from the main power IC 200 in accordance with the touch synchronization signal Tsync.

The signal converter 400 may generate a second load free driving signal VGL_LFD_#2 by dropping a voltage level of the first load free driving signal VGL_LFD_#1 applied from the touch power IC 300 in accordance with the touch synchronization signal, and may generate a pseudo touch driving signal VGL_LFD_D by dropping the voltage level of the first load free driving signal VGL_LFD_#1 and phase-inverting the signal of which voltage level has been dropped. Also, the signal converter 400 may generate a second touch driving signal Vcom_TDS_#2 by dropping the voltage level of the first touch driving signal Vcom_TDS_#1 applied from the touch power IC 300 in accordance with the touch synchronization signal Tsync.

According to still another embodiment of the present disclosure, the touch power IC 300 may generate the first load free driving signal VGL_LFD_#1 and the first touch driving signal Vcom_TDS_#1 based on the touch synchronization signal Tsync and a touch pulse control signal TFCS for touch sensing. For example, the touch pulse control signal may include at least one of a beacon signal, a ping signal, and a load free driving (LFD) signal. The beacon signal is intended to acquire a touch coordinate of a user's pointer (e.g., finger or pen), and may be a pulse signal of about 7V (e.g., a pulse signal having an amplitude of about 7V). The ping signal is intended for mutual transmission and reception of a signal when a pen among the user's pointers is an active pen having a signal transmission and reception function, and may be a pulse signal of about 7V (e.g., a pulse signal having an amplitude of about 7V). Also, the LFD signal is intended to reduce an influence of parasitic capacitance on a touch sensing result during touch sensing, and may be a pulse signal of about 3V (e.g., a pulse signal having an amplitude of about 3V).

The touch power IC 300 may generate a signal having a single pulse width by synthesizing the beacon signal, the ping signal or the LFD signal included in the touch pulse control signal, or may generate the beacon signal, the ping signal or the LFD signal as a signal having a plurality of pulse widths arranged in a time-division manner for a period when the touch driving signal is output.

The first load free driving signal VGL_LFD_#1 generated by the touch power IC 300 may be converted to the second load free driving signal VGL_LFD_#2 and the pseudo touch driving signal VGL_LFD_D by the signal converter 400 and then applied to the level shifter 600. Also, the first touch driving signal Vcom_TDS_#1 may be converted to the second touch driving signal Vcom_TDS_#2 by the signal converter 400 and then applied to the plurality of touch electrodes TE through the plurality of touch lines TL.

Referring to FIGS. 12 and 13, the level shifter 600 of the touch display apparatus according to still another embodiment of the present disclosure may include an N−1th clock 610 outputting an N−1th (N is a natural number of 2 or more) gate pulse, and an Nth clock 620 outputting an Nth gate pulse. That is, the N−1th clock 610 may process signals of odd clocks, and the Nth clock 620 may process signals of even clocks.

The N−1th clock 610 may output the N−1th gate pulse (e.g., gate pulse of odd clock) based on the gate high voltages VGH1 and VGH2 applied from the main power IC 200 for the display driving period DS, in accordance with the touch synchronization signal Tsync, and may output N−1th touch driving gate pulse based on the second load free driving signal VGL_LFD_#2 of which voltage level has been dropped by the voltage drop 401 of the signal converter 400 for the touch driving period TS.

The Nth clock 620 may output the Nth gate pulse (e.g., gate pulse of even clock) based on the gate high voltages VGH1 and VGH2 applied from the main power IC 200 for the display driving period DS, in accordance with the touch synchronization signal Tsync, and may output Nth touch driving gate pulse based on the pseudo touch driving signal VGL_LFD_D of which voltage level has been dropped and phase has been inverted by the voltage drop 401 and the phase inverter 402 of the signal converter 400 for the touch driving period TS. That is, a plurality of clock signals (for example, 8-phase or 10-phase) output from the level shifter 600 may be output as the touch driving gate pulses of which adjacent clocks (e.g., odd clock G1 and its adjacent even clock G2) have phases opposite to each other.

According to still another embodiment of the present disclosure, the N−1th touch driving gate pulse and the Nth touch driving gate pulse, which are output from the level shifter 600, may respectively be amplified by inversion or non-inversion and then applied to the gate lines GL.

Figure 14:
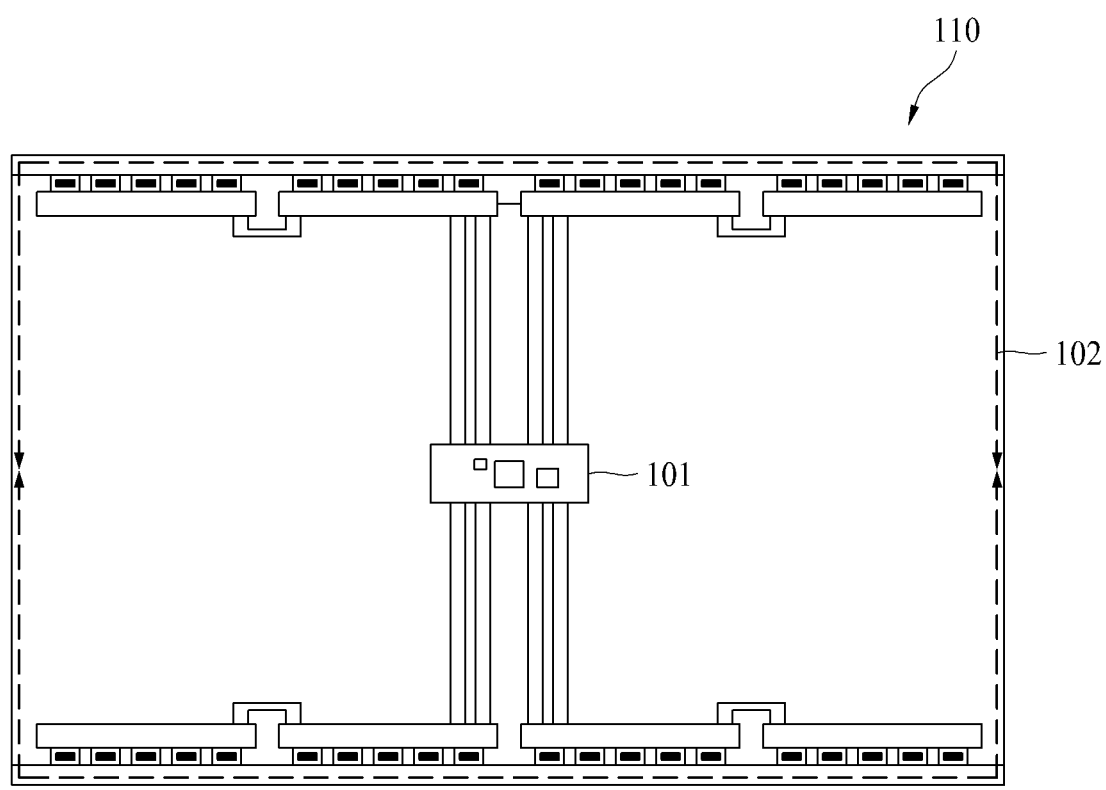
FIG. 14 is a view illustrating a transmission path of a touch driving signal in a touch display apparatus according to another embodiment of the present disclosure.
Figure 15A:
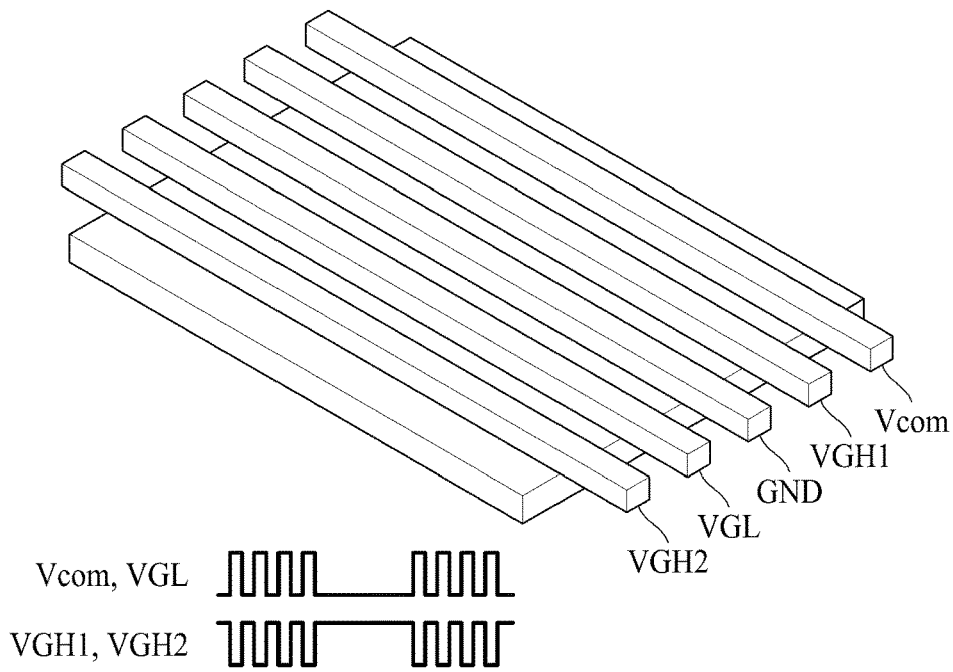
FIGS. 15A and 15B are views illustrating a power line of a touch driving signal in a touch display apparatus according to various embodiments of the present disclosure.
Figure 15B:
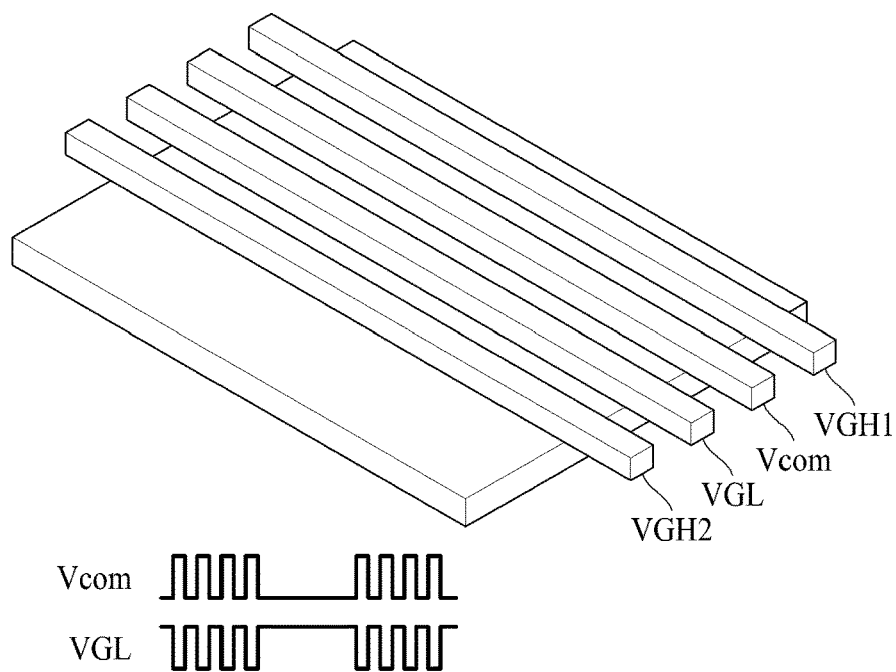

FIG. 14 is a view illustrating a transmission path of a touch driving signal in a touch display apparatus according to another embodiment of the present disclosure, and FIGS. 15A and 15B are views illustrating a power line of a touch driving signal in a touch display apparatus according to various embodiments of the present disclosure.

Referring to FIG. 14, a PCB substrate 101 may be disposed at a center portion of the display panel 110 of the touch display apparatus according to various embodiments of the present disclosure. The main power IC 200, the touch power IC 300 and the gate shifter 600 may be packaged in the PCB substrate 101. Voltage signals output from the main power IC 200, the touch power IC 300 and the gate shifter 600 may start from the center portion of the display panel 110, and then may be supplied to a necessary position (e.g., gate lines, touch electrodes, etc.) through power lines 102 that may be disposed to surround the bezel area of the display panel 110.

The touch driving signals and the pseudo touch driving signals in the touch display apparatus according to one embodiment of the present disclosure, as shown in FIG. 15A, may be applied to the display panel 110 through power lines in which the touch driving signal based on the common voltage Vcom and the pseudo touch driving signal based on the first gate high voltage VGH1 are disposed to adjoin each other in the form of a pair. Also, the touch driving signals and the pseudo touch driving signals may be applied to the display panel 110 through power lines in which the touch driving signal based on the gate low voltage VGL and the pseudo touch driving signal based on the second gate high voltage VGH2 are disposed to adjoin each other in the form of a pair. At this time, a ground line GND may be disposed between the power lines separated by two groups in the form of a pair.

The touch driving signals and the pseudo touch driving signals in the touch display apparatus according to another embodiment of the present disclosure, as shown in FIG. 15B, may be applied to the display panel 110 through power lines in which the touch driving signal based on the common voltage Vcom and the pseudo touch driving signal based on the gate low voltage VGL are disposed to adjoin each other in the form of a pair. At this time, a power line of the first gate high voltage VGH1 and a power line of the second gate high voltage VGH2 may respectively be disposed between the power lines grouped in one group in the form of a pair.

Figure 16:
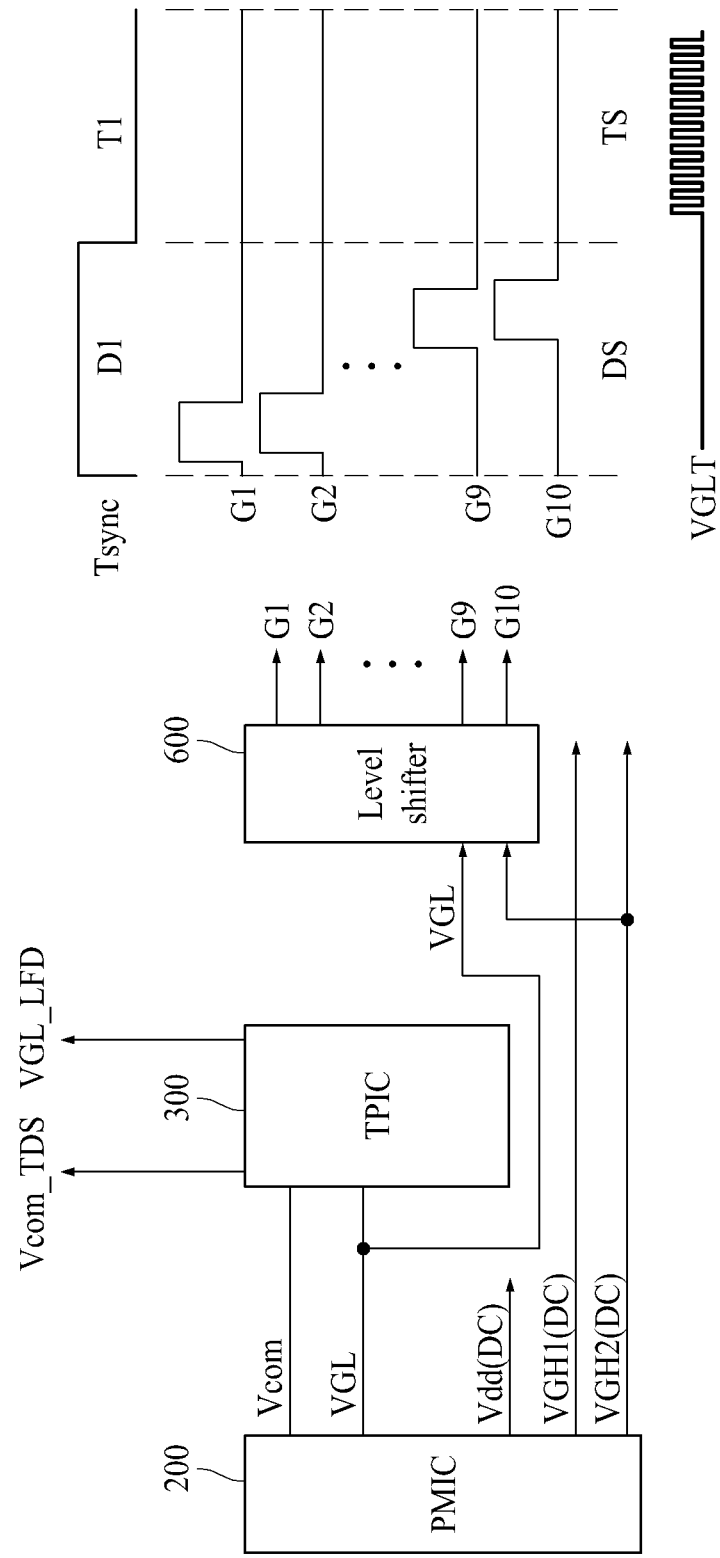
FIG. 16 is a view illustrating a touch driving operation in a touch display apparatus according to still another embodiment of the present disclosure.
Figure 17:
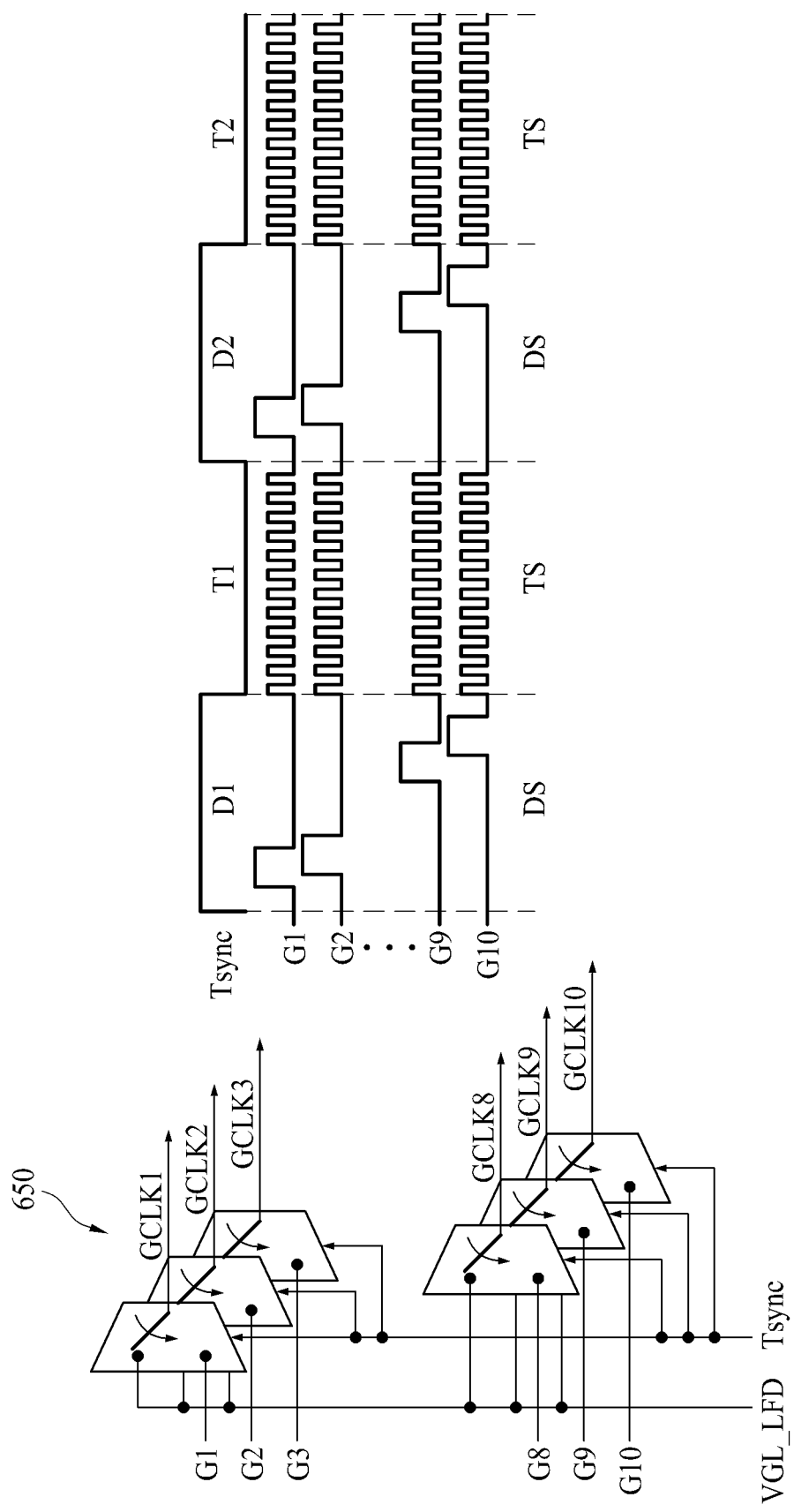
FIG. 17 is a view illustrating a touch driving operation in a touch display apparatus according to further still another embodiment of the present disclosure.
Figure 18:
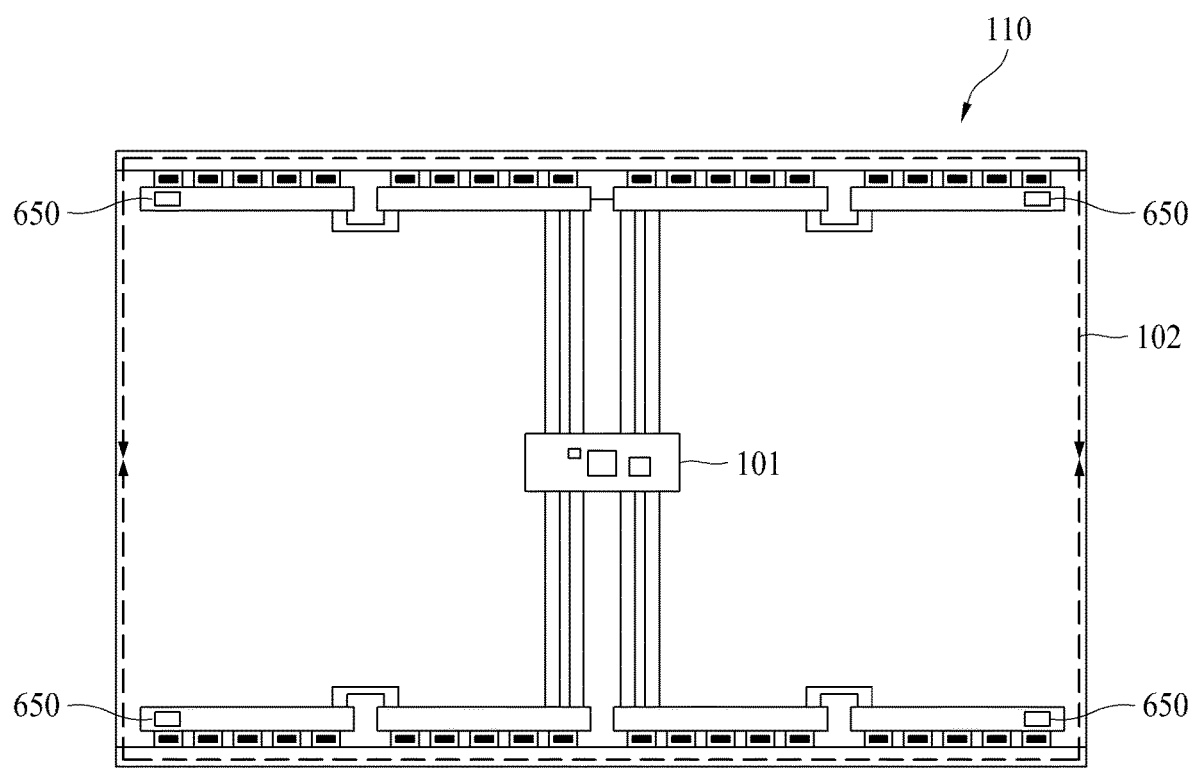
FIG. 18 is a view illustrating a transmission path of a touch driving signal in a touch display apparatus according to further still another embodiment of the present disclosure.

FIG. 16 is a view illustrating a touch driving operation in a touch display apparatus according to still another embodiment of the present disclosure, FIG. 17 is a view illustrating a touch driving operation in a touch display apparatus according to further still another embodiment of the present disclosure, and FIG. 18 is a view illustrating a transmission path of a touch driving signal in a touch display apparatus according to further still another embodiment of the present disclosure.

Referring to FIGS. 16 to 18 in connection with FIGS. 1 to 3, the touch display apparatus according to further still another embodiment of the present disclosure may include a main power IC 200, a touch power IC 300, and a level shifter 600.

The main power IC 200 may generate a common voltage Vcom, a gate low voltage VGL, a first gate high voltage VGH1, a second gate high voltage VGH2, and a high potential driving voltage Vdd. The main power IC 200 may supply various DC voltages (e.g., Vcom, VGL, VGH1, VGH2, etc.) required for signal supply of the touch power IC 300 to the touch power IC 300.

The main power IC 200 may supply various DC voltages (e.g., Vdd, etc.) required for data driving of the data driving circuit 130 to the data driving circuit 130.

The touch power IC 300 may receive the common voltage Vcom and the gate low voltage VGL of the DC voltages from the main power IC 200. The gate low voltage VGL is a voltage capable of turning off the TFTs included in the display panel 110. The touch power IC 300 may supply the touch driving signal required for driving of the touch electrodes TE to the touch driving circuit 160 and the gate driving circuit 140.

The level shifter 600 may be a partial element of the gate driving circuit 140, and may generate a gate pulse based on a signal applied through the main power IC 200 and the touch power IC 300. The gate pulse output from the level shifter 600 may be supplied to the shift register.

Referring to FIG. 16, the touch power IC 300 of the touch display apparatus according to further still another embodiment of the present disclosure may generate a touch driving signal Vcom_TDS of a pulse type (in other words, a pulse signal type, in still other words, being a pulse signal) by using the common voltage Vcom applied from the main power IC 200 in accordance with the touch synchronization signal Tsync that defines the display driving period DS and the touch driving period TS. Also, the touch power IC 300 may generate a pseudo touch driving signal VGL_LFD_D corresponding to the pulse type and having reverse phase which is inverted, by using the gate low voltage VGL applied from the main power IC 200 in accordance with the touch synchronization signal Tsync.

The touch driving signal Vcom_TDS generated by the touch power IC 300 may be applied to the plurality of touch electrodes TE through the plurality of touch lines TL. Also, the pseudo touch driving signal VGL_LFD_D generated by the touch power IC 300 may be applied to the plurality of gate lines GL disposed in the display panel 110 through the gate driving circuit 140.

The level shifter 600 may be a partial element of the gate driving circuit 140, and may generate a gate pulse based on the signal applied through the main power IC 200. The gate pulse output from the level shifter 600 may be supplied to the shift register.

According to further still another embodiment of the present disclosure, the gate pulse output from the level shifter may be applied to a gate pulse selector 650 disposed before being supplied to the shift register.

Referring to FIG. 17, the gate pulse output from the level shifter 600 and the pseudo touch driving signal VGL_LFD_D output from the touch power IC 300 may be applied to the gate pulse selector 650 according to further still another embodiment of the present disclosure.

The gate pulse selector 650 may output the gate pulse applied from the level shifter 600 for the display driving period DS in accordance with the touch synchronization signal Tsync that defines the display driving period DS and the touch driving period TS, and may output the pseudo touch driving signal VGL_LFD_D output from the touch power IC 300 for the touch driving period TS.

In further still another embodiment of the present disclosure, a path through which the pulse type touch driving signal is transmitted may be minimized or reduced, whereby an influence of EMI that may be caused by the pulse type touch driving signal may be minimized or reduced.

Referring to FIG. 18, a PCB substrate 101 may be disposed at a center portion of the display panel 110 of the touch display apparatus according to further still another embodiment of the present disclosure. The main power IC 200, the touch power IC 300 and the gate shifter 600 may be packaged in the PCB substrate 101. Voltage signals output from the main power IC 200, the touch power IC 300 and the gate shifter 600 may start from the center portion of the display panel 110, and then may be supplied to a necessary position (e.g., gate lines, touch electrodes, etc.) through power lines 102 that may be disposed to surround the bezel area of the display panel 110.

The gate pulse selector 650 according to further still another embodiment of the present disclosure may be disposed at a center portion of a path of the power lines 102, that is, four edge areas of the display panel 110. The gate pulse selector 650 may receive the signals from the level shifter 600 and the touch power IC 300, and may divide the input signals into the gate pulse from the level shifter 600 and the pseudo touch driving signal from the touch power IC 300 based on the synchronization signal Tsync for the display driving period DS and the touch driving period TS, whereby the corresponding signals may be applied to the gate lines GL.

Figure 19A:
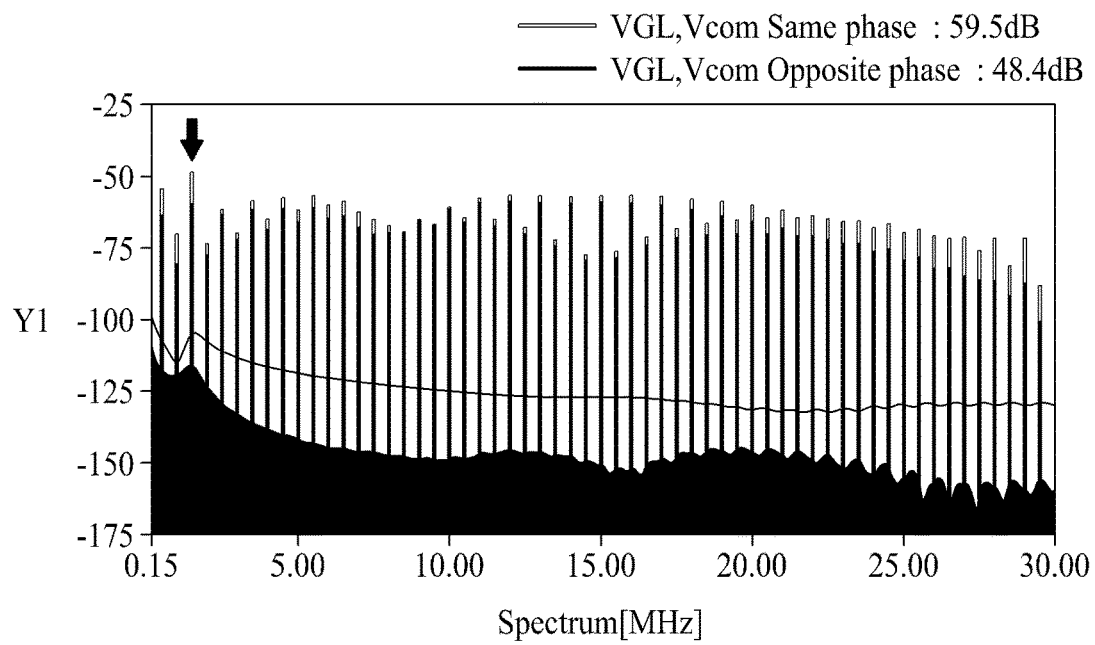
FIGS. 19A to 19C are graphs illustrating a simulation result showing EMI improvement effect of a touch display apparatus according to various embodiments of the present disclosure.
Figure 19B:
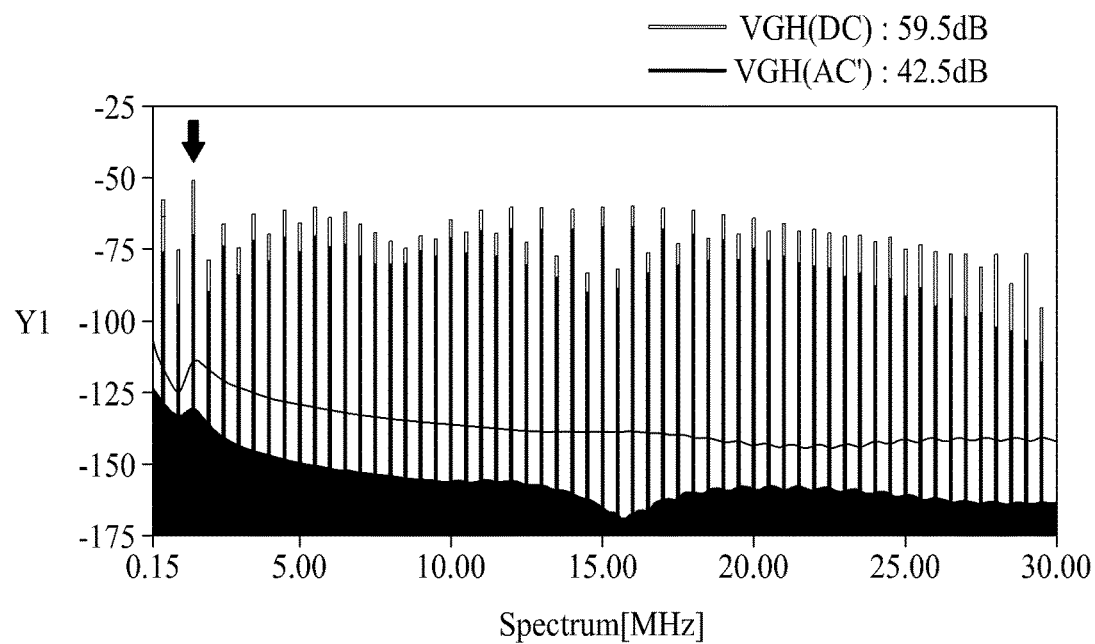
Figure 19C:
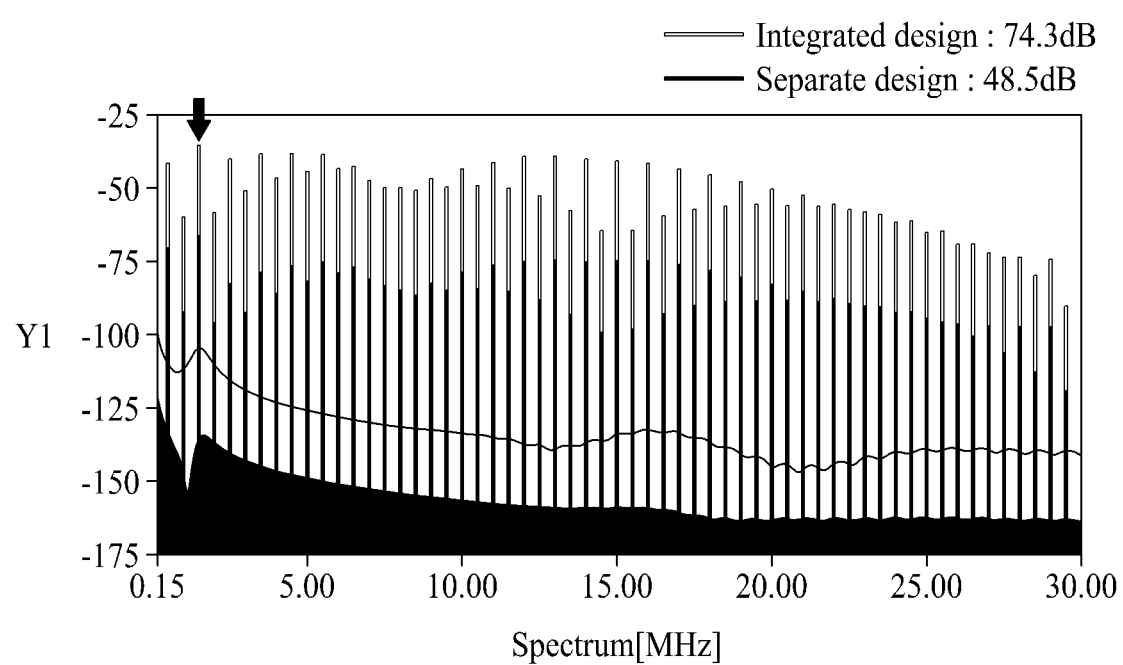

FIGS. 19A to 19C are graphs illustrating a simulation result showing EMI improvement effect of a touch display apparatus according to various embodiments of the present disclosure.

Referring to FIGS. 19A to 19C, if the touch display apparatus drives a touch electrode by using a touch driving signal having a single frequency of 500 KHz, for example, signal intensity of EMI signal per frequency that may be generated by the touch driving signal may be measured to obtain a measurement average value and a measurement upper limit of the EMI signal per frequency.

FIG. 19A illustrates a measurement simulation result of EMI signal when the pseudo touch driving signals VGH1_LFD_D and VGH2_LFD_D generated using the gate high voltage VGH together with the load free driving signal VGL_LFD and the touch driving signal Vcom_TDS are applied to the touch display apparatus according to one embodiment of the present disclosure, and when the pseudo touch driving signals VGH1_LFD_D and VGH2_LFD_D are not applied to a touch display apparatus of a comparison example.

As a result of measurement simulation, it is noted that EMI signal intensity of the touch display apparatus according to one embodiment of the present disclosure has been more reduced than that of the comparison example. For example, it is noted that EMI signal intensity of the comparison example is 59.5 dB and the touch display apparatus according to one embodiment of the present disclosure is 48.4 dB, in case of a bandwidth frequency of 1.5 MHz, and as a result, a numerical value of 11.1 dB has been reduced.

FIG. 19B illustrates a measurement simulation result of EMI signal when the load free driving signal VGL_LFD and the touch driving signal Vcom_TDS have phases opposite to each other in the touch display apparatus according to another embodiment of the present disclosure, and when the load free driving signal VGL_LFD and the touch driving signal Vcom_TDS have the same phases as each other in the touch display apparatus of the comparison example.

As a result of measurement simulation, it is noted that EMI signal intensity of the touch display apparatus according to one embodiment of the present disclosure has been more reduced than that of the comparison example. For example, it is noted that EMI signal intensity of the comparison example is 59.5 dB and the touch display apparatus according to another embodiment of the present disclosure is 42.5 dB, in case of a bandwidth frequency of 1.5 MHz, and as a result, a numerical value of 17 dB has been reduced.

FIG. 19C illustrates a measurement simulation result of EMI signal when the touch driving signals are separately applied to the gate pulse of the level shifter in the touch display apparatus according to other embodiment of the present disclosure, and when the touch driving signals are integrated to be applied to the gate pulse in the touch display apparatus of the comparison example.

As a result of measurement simulation, it is noted that EMI signal intensity of the touch display apparatus according to other embodiment of the present disclosure has been more reduced than that of the comparison example. For example, it is noted that EMI signal intensity of the comparison example is 74.3 dB and the touch display apparatus according to other embodiment of the present disclosure is 48.5 dB, in case of a bandwidth frequency of 1.5 MHz, and as a result, a numerical value of 25.8 dB has been reduced.

As described above, EMI level of the touch display apparatus according to various embodiments may be improved more remarkably than the comparison example.

The touch display apparatus according to various embodiments of the present disclosure may be described as follows.

The touch display apparatus according to various embodiments of the present disclosure may comprise a display panel on which pixels and touch electrodes are disposed, a main power IC generating a common voltage signal applied to the touch electrodes and at least one gate voltage signal applied to the pixels, a touch power IC outputting a touch driving signal of a pulse type (in other words, a touch driving signal of a pulse signal type; in still other words, a touch driving signal being a pulse signal) in accordance with a touch synchronization signal that defines a display driving period and a touch driving period, outputting a load free driving signal of the pulse type by using a gate low voltage signal of the at least one gate voltage signal, and outputting at least one pseudo touch driving signal corresponding to a pulse pattern of the touch driving signal and the load free driving signal and having reverse phase which is inverted, by using at least one gate high voltage signal of the at least one gate voltage signal, and a gate driving circuit supplying a gate pulse based on the at least one gate voltage signal to gate lines connected to the pixels for the display driving period, and supplying the load free driving signal to the gate lines for the touch driving period.

In the touch display apparatus according to various embodiments of the present disclosure, the touch power IC may generate the touch driving signal and the load free driving signal based on the touch synchronization signal and a touch pulse control signal for touch sensing.

In the touch display apparatus according to various embodiments of the present disclosure, the touch pulse control signal may include at least one of a beacon signal, a ping signal and a load free driving (LFD) signal.

In the touch display apparatus according to various embodiments of the present disclosure, the common voltage signal output from the main power IC and the at least one gate voltage signal may be DC voltage signals.

In the touch display apparatus according to various embodiments of the present disclosure, the touch power IC may generate the touch driving signal by pulse-converting the common voltage signal, generate the load free driving signal by pulse-converting of the gate low voltage signal, generate a first pseudo touch driving signal by pulse-converting a first gate high voltage signal of the at least one gate high voltage signal and inverting phase of the pulse-converted signal, and generate a second pseudo touch driving signal by pulse-converting a second gate high voltage signal of the at least one gate high voltage signal and inverting phase of the pulse-converted signal.

In the touch display apparatus according to various embodiments of the present disclosure, the first gate high voltage signal may have a voltage level higher than that of the second gate high voltage signal.

In the touch display apparatus according to various embodiments of the present disclosure, the load free driving signal and the first pseudo touch driving signal may be applied to the display panel through first power lines disposed to adjoin each other in the form of a pair, and the touch driving signal and the second pseudo touch driving signal may be applied to the display panel through second power lines disposed to adjoin each other in the form of a pair.

In the touch display apparatus according to various embodiments of the present disclosure, a ground line may be disposed between the first power lines and the second power lines.

In the touch display apparatus according to various embodiments of the present disclosure, the gate driving circuit may not supply the at least one pseudo touch driving signal to the gate lines for the touch driving period.

The touch display apparatus according to various embodiments of the present disclosure may comprise a display panel on which pixels and touch electrodes are disposed, a main power IC generating a common voltage signal applied to the touch electrodes and at least one gate voltage signal applied to the pixels, a touch power IC outputting a first touch driving signal of a pulse type (in other words, a first touch driving signal of a pulse signal type; in still other words, a first touch driving signal being a pulse signal) in accordance with a touch synchronization signal that defines a display driving period and a touch driving period, and outputting a first load free driving signal of the pulse type by using a gate low voltage signal of the at least one gate voltage signal, a signal converter outputting a pseudo touch driving signal by converting phase of the first load free driving signal, and a signal recovery unit disposed at an input front end of the pixels, recovering the first load free driving signal from the pseudo touch driving signal.

In the touch display apparatus according to various embodiments of the present disclosure, the signal converter may generate a second touch driving signal by dropping a voltage level of the first touch driving signal, generate a second load free driving signal by dropping a voltage level of the first load free driving signal, and generate the pseudo touch driving signal by dropping the voltage level of the first load free driving signal and inverting phase of the signal of which voltage level has been dropped.

In the touch display apparatus according to various embodiments of the present disclosure, the signal recovery unit may recover the first touch driving signal by amplifying the second touch driving signal through non-inversion and recover the first load free driving signal by amplifying the pseudo touch driving signal through inversion.

The touch display apparatus according to various embodiments of the present disclosure may further comprise a gate driving circuit supplying a gate pulse based on the at least one gate voltage signal to gate lines connected to the pixels for the display driving period and supplying the first load free driving signal recovered by the signal recovery unit to the gate lines for the touch driving period.

In the touch display apparatus according to various embodiments of the present disclosure, the pseudo touch driving signal and the second touch driving signal may be applied to the display panel through power lines disposed to adjoin each other in the form of a pair.

In the touch display apparatus according to various embodiments of the present disclosure, power lines for receiving a first gate high voltage signal and a second gate high voltage signal of the at least one gate signal voltage may be disposed between the power lines disposed to adjoin in the form of a pair.

In the touch display apparatus according to various embodiments of the present disclosure, the signal converter may output the second load free driving signal and the pseudo touch driving signal, and the gate driving circuit may include a level shifter generating a gate pulse based on the at least one gate voltage signal, the second load free driving signal and the pseudo touch driving signal, and a shift register sequentially supplying the gate pulse output from the level shifter to the gate lines connected to the pixels.

In the touch display apparatus according to various embodiments of the present disclosure, the level shifter may include an N−1th clock outputting an N−1th (N is a natural number of 2 or more) gate pulse, and an Nth clock outputting an Nth gate pulse, wherein the N−1th clock may output the N−1th gate pulse based on a gate high voltage signal of the at least one gate voltage signal for the display driving period and output an N−1th touch driving gate pulse based on the pseudo touch driving signal for the touch driving period, and the Nth clock may output the Nth gate pulse based on the gate high voltage signal of the at least one gate voltage signal for the display driving period and output an Nth touch driving gate pulse based on the second load free driving signal for the touch driving period.

The touch display apparatus according to various embodiments of the present disclosure may further comprise a gate signal recovery unit at an input front end of the gate lines, wherein the gate signal recovery unit may output the N−1th touch driving gate pulse based on the pseudo touch driving signal through inversion amplification and output the Nth touch driving gate pulse based on the second load free driving signal through non-inversion amplification.

The touch display apparatus according to various embodiments of the present disclosure may comprise a display panel on which pixels and touch electrodes are disposed, a main power IC generating a common voltage signal applied to the touch electrodes and at least one gate voltage signal applied to the pixels, a touch power IC outputting a load free driving signal of a pulse type (in other words, a load free driving signal of a pulse signal type; in still other words, a load free driving signal being a pulse signal) in accordance with a touch synchronization signal that defines a display driving period and a touch driving period, and outputting the load free driving signal of the pulse type by using a gate low voltage signal of the at least one gate voltage signal, a gate driving circuit including a level shifter generating a gate pulse based on the at least one gate voltage signal and a shift register sequentially supplying the gate pulse output from the level shifter to gate lines connected to the pixels, and a gate signal selector disposed at an input front end of the shift register, supplying the gate pulse output from the level shifter to the shift register for the display driving period and supplying the load free driving signal to the shift register for the touch driving period.

In the touch display apparatus according to various embodiments of the present disclosure, the level shifter may include an N−1th clock outputting an N−1th (N is a natural number of 2 or more) gate pulse, and an Nth clock outputting an Nth gate pulse, wherein the N−1th clock may output the N−1th gate pulse based on a gate high voltage signal of at least one gate voltage signal, the Nth clock may output the Nth gate pulse based on the gate high voltage signal of the at least one gate voltage signal, and the gate signal selector may sequentially supply the N−1th gate pulse and the Nth gate pulse to the shift register for the display driving period and supply the load free driving signal to the shift register for the touch driving period.

The touch display apparatus according to various embodiments of the present disclosure may comprise a touch panel including a plurality of touch electrodes and a plurality of touch lines, a touch driving circuit sensing the plurality of touch electrodes through the plurality of touch lines, and a touch power circuit transferring a touch driving signal to the touch driving circuit through a touch signal line, wherein the touch power circuit may apply the touch driving signal to the touch signal line for a touch sensing period of the touch panel, and may apply a pseudo touch driving signal corresponding to a pulse (e.g., a pulse pattern) of the touch driving signal and having reverse phase which is inverted, to a pseudo touch signal line disposed to adjoin the touch signal line.

The touch display apparatus according to various embodiments of the present disclosure may further comprise a display panel on which a plurality of gate lines are disposed, and a gate driving circuit driving the plurality of gate lines, wherein the touch power circuit may transfer a gate load free driving signal to the gate driving circuit through a gate signal line, and may apply a pseudo gate load free driving signal corresponding to a pulse (e.g., a pulse pattern) of the gate load free driving signal and having reverse phase which is inverted, to a pseudo gate signal line disposed to adjoin the gate signal line for the touch sensing period of the touch panel.

In the touch display apparatus according to various embodiments of the present disclosure, the touch signal line and the gate signal line may be disposed outside the display panel, and a ground line may further be disposed between the touch signal line and the gate signal line.

It will be apparent to those skilled in the art that the present disclosure described above is not limited by the above-described embodiments and the accompanying drawings and that various substitutions, modifications, and variations can be made in the present disclosure without departing from the spirit or scope of the disclosures. Consequently, the scope of the present disclosure is defined by the accompanying claims, and it is intended that all variations or modifications derived from the meaning, scope, and equivalent concept of the claims fall within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display apparatus comprising:
a display panel on which pixels and touch electrodes are disposed;
a main power integrated circuit configured to generate a common voltage signal applied to the touch electrodes and at least one gate voltage signal applied to the pixels;
a touch power integrated circuit configured to:
output a touch driving signal of a pulse type in accordance with a touch synchronization signal that defines a display driving period and a touch driving period,
output a load free driving signal of the pulse type by using a gate low voltage signal of the at least one gate voltage signal, and
output at least one pseudo touch driving signal corresponding to a pulse pattern of the touch driving signal and the load free driving signal and having reverse phase which is inverted, by using at least one gate high voltage signal of the at least one gate voltage signal; and
a gate driving circuit configured to:
supply a gate pulse based on the at least one gate voltage signal to gate lines connected to the pixels for the display driving period, and
supply the load free driving signal to the gate lines for the touch driving period.

2. The touch display apparatus of claim 1, wherein the touch power integrated circuit is configured to generate the touch driving signal and the load free driving signal based on the touch synchronization signal and a touch pulse control signal for touch sensing.

3. The touch display apparatus of claim 2, wherein the touch pulse control signal includes at least one of a beacon signal, a ping signal, or a load free driving (LFD) signal.

4. The touch display apparatus of claim 1, wherein the common voltage signal output from the main power integrated circuit and the at least one gate voltage signal are direct current voltage signals.

5. The touch display apparatus of claim 1, wherein the touch power integrated circuit is configured to:
generate the touch driving signal by pulse-converting the common voltage signal,
generate the load free driving signal by pulse-converting the gate low voltage signal,
generate a first pseudo touch driving signal by pulse-converting a first gate high voltage signal of the at least one gate high voltage signal and inverting phase of the pulse-converted signal, and
generate a second pseudo touch driving signal by pulse-converting a second gate high voltage signal of the at least one gate high voltage signal and inverting phase of the pulse-converted signal.

6. The touch display apparatus of claim 5, wherein the first gate high voltage signal has a first voltage level that is greater than a second voltage level of the second gate high voltage signal.

7. The touch display apparatus of claim 5, further comprising:
first power lines disposed to adjoin each other in the form of a pair;
second power lines disposed to adjoin each other in the form of a pair; and
a ground line disposed between the first power lines and the second power lines,
wherein the load free driving signal and the first pseudo touch driving signal are applied to the display panel through the first power lines, and the touch driving signal and the second pseudo touch driving signal are applied to the display panel through the second power lines.

8. The touch display apparatus of claim 1, wherein the gate driving circuit is configured to not supply the at least one pseudo touch driving signal to the gate lines for the touch driving period.

9. A touch display apparatus comprising:
a display panel on which pixels and touch electrodes are disposed;
a main power integrated circuit configured to generate a common voltage signal applied to the touch electrodes and at least one gate voltage signal applied to the pixels;
a touch power integrated circuit configured to:
output a first touch driving signal of a pulse type in accordance with a touch synchronization signal that defines a display driving period and a touch driving period, and
output a first load free driving signal of the pulse type by using a gate low voltage signal of the at least one gate voltage signal;
a signal converter configured to output a pseudo touch driving signal by converting a phase of the first load free driving signal; and
a signal recovery unit disposed at an input front end of the pixels, the signal recovery unit configured to recover the first load free driving signal from the pseudo touch driving signal.

10. The touch display apparatus of claim 9, wherein the signal converter is configured to:
generate a second touch driving signal by dropping a voltage level of the first touch driving signal,
generate a second load free driving signal by dropping a voltage level of the first load free driving signal, and
generate the pseudo touch driving signal by dropping the voltage level of the first load free driving signal and inverting phase of the signal of which voltage level has been dropped.

11. The touch display apparatus of claim 10, wherein the signal recovery unit is configured to:
recover the first touch driving signal by amplifying the second touch driving signal through a non-inversion amplification, and
recover the first load free driving signal by amplifying the pseudo touch driving signal through an inversion amplification.

12. The touch display apparatus of claim 9, further comprising a gate driving circuit configured to:
supply a gate pulse based on the at least one gate voltage signal to gate lines connected to the pixels for the display driving period, and
supply the first load free driving signal recovered by the signal recovery unit to the gate lines for the touch driving period.

13. The touch display apparatus of claim 10, further comprising power lines disposed to adjoin each other in the form of a pair,
wherein the pseudo touch driving signal and the second touch driving signal are applied to the display panel through the power lines.

14. The touch display apparatus of claim 13, further comprising power lines configured to receive a first gate high voltage signal and a second gate high voltage signal of the at least one gate voltage signal and disposed between the power lines disposed to adjoin in each other in the form of a pair.

15. The touch display apparatus of claim 13, further comprising a gate driving circuit configured to:
   supply a gate pulse based on the at least one gate voltage signal to gate lines connected to the pixels for the display driving period, and
   supply the first load free driving signal recovered by the signal recovery unit to the gate lines for the touch driving period,
   wherein the signal converter is configured to output the second load free driving signal and the pseudo touch driving signal, and
   the gate driving circuit includes:
      a level shifter configured to generate a gate pulse based on the at least one gate voltage signal, the second load free driving signal, and the pseudo touch driving signal; and
      a shift register configured to sequentially supply the gate pulse output from the level shifter to the gate lines connected to the pixels.

16. The touch display apparatus of claim 15, wherein the level shifter includes:
   an N−1th clock configured to output an N−1th gate pulse, wherein N is a natural number of 2 or more; and
   an Nth clock configured to output an Nth gate pulse,
   wherein the N−1th clock is configured to:
      output the N−1th gate pulse based on a gate high voltage signal of the at least one gate voltage signal for the display driving period, and
      output an N−1th touch driving gate pulse based on the pseudo touch driving signal for the touch driving period, and
   wherein the Nth clock is configured to:
      output the Nth gate pulse based on the gate high voltage signal of the at least one gate voltage signal for the display driving period, and
      output an Nth touch driving gate pulse based on the second load free driving signal for the touch driving period.

17. The touch display apparatus of claim 16, further comprising a gate signal recovery unit at an input front end of the gate lines, wherein the gate signal recovery unit is configured to:
   output the N−1th touch driving gate pulse based on the pseudo touch driving signal through an inversion amplification, and
   output the Nth touch driving gate pulse based on the second load free driving signal through a non-inversion amplification.

18. A touch display apparatus comprising:
   a touch panel including a plurality of touch electrodes and a plurality of touch lines;
   a touch driving circuit configured to sense the plurality of touch electrodes through the plurality of touch lines; and
   a touch power circuit configured to transfer a touch driving signal to the touch driving circuit through a touch signal line,
   wherein the touch power circuit is configured to:
      apply the touch driving signal to the touch signal line for a touch sensing period of the touch panel, and
      apply a pseudo touch driving signal corresponding to a first pulse waveform of the touch driving signal to a pseudo touch signal line disposed to adjoin the touch signal line in the form of a pair, the pseudo touch driving signal having a second pulse waveform, and
   wherein the first pulse waveform and the second pulse waveform are 180 degrees out of phase with each other.

19. The touch display apparatus of claim 18, further comprising a display panel on which a plurality of gate lines are disposed, and a gate driving circuit configured to drive the plurality of gate lines,
   wherein the touch power circuit is configured to:
      transfer a gate load free driving signal to the gate driving circuit through a gate signal line, and
      apply a pseudo gate load free driving signal corresponding to a third pulse waveform of the gate load free driving signal to a pseudo gate signal line disposed to adjoin the gate signal line for the touch sensing period of the touch panel, the pseudo gate signal line having a fourth pulse waveform, and
   wherein the third pulse waveform and the fourth pulse waveform are 180 degrees out of phase with each other.

20. The touch display apparatus of claim 19, wherein the touch signal line and the gate signal line are disposed outside the display panel, and a ground line is disposed between the touch signal line and the gate signal line.

* * * * *